(12) United States Patent
Yoo et al.

(10) Patent No.: US 12,550,280 B2
(45) Date of Patent: Feb. 10, 2026

(54) ELECTRONIC DEVICE COMPRISING ANTENNA

(71) Applicant: SAMSUNG ELECTRONICS CO., LTD., Suwon-si (KR)

(72) Inventors: Chaeup Yoo, Suwon-si (KR); Sanggon Shin, Suwon-si (KR); Kyungtae Nam, Suwon-si (KR); Oleg Feygenson, Suwon-si (KR); Hyungjin Kim, Suwon-si (KR); Jungkyu Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 18/296,664

(22) Filed: Apr. 6, 2023

(65) Prior Publication Data

US 2023/0247789 A1    Aug. 3, 2023

Related U.S. Application Data

(63) Continuation of application No. PCT/KR2021/012752, filed on Sep. 17, 2021.

(30) Foreign Application Priority Data

Oct. 8, 2020  (KR) ........................ 10-2020-0130369

(51) Int. Cl.
*H05K 7/14* (2006.01)
*H04M 1/02* (2006.01)
(Continued)

(52) U.S. Cl.
CPC ........ *H05K 7/1427* (2013.01); *H04M 1/0277* (2013.01); *H05K 1/0277* (2013.01); *H01Q 1/12* (2013.01)

(58) Field of Classification Search
CPC . H05K 7/1427; H05K 1/0277; H04M 1/0277; H01Q 1/12
(Continued)

(56) References Cited

U.S. PATENT DOCUMENTS 8,366,457 B2    2/2013   Yamamoto et al.
8,380,258 B2    2/2013   Kim et al.
(Continued)

FOREIGN PATENT DOCUMENTS

CN    108667983 A    10/2018
JP    2006287827 A   10/2006
(Continued)

OTHER PUBLICATIONS

Korean Notice of Final Rejection dated Jun. 24, 2025 for KR Application No. 10-2020-0130369.
(Continued)

*Primary Examiner* — Andargie M Aychillhum
(74) *Attorney, Agent, or Firm* — Nixon & Vanderhye P.C.

(57) ABSTRACT

An electronic device may include a housing comprising a first surface facing a first direction, a second surface facing a second direction opposite to the first direction, and a third surface surrounding the space formed by the first surface and the second surface; a metal frame forming at least one region of the housing, the metal frame comprising a groove formed at a first point; a flexible printed circuit board (FPCB) disposed in the inner space of the housing; a conductive connection member coupled to the FPCB, a first portion of the conductive connection member being fixed in one region of the FPCB, and a second portion of the conductive connection member having elasticity; and a wireless communication circuit disposed on the FPCB or electrically connected to the FPCB, wherein: the second portion of the conductive connection member is at least partially inserted
(Continued)

into the groove of the metal frame; and the wireless communication circuit transmits and receives signals in a designated frequency band by supplying power to the metal frame at the first point through the FPCB and the conductive connection member.

14 Claims, 22 Drawing Sheets

(51) Int. Cl.
    *H05K 1/02*         (2006.01)
    *H01Q 1/12*         (2006.01)

(58) Field of Classification Search
    USPC .......................................................... 361/749
    See application file for complete search history.

(56) References Cited

U.S. PATENT DOCUMENTS

| | | |
|---|---|---|
| 9,705,180 B2 | 7/2017 | Darnell et al. |
| 9,763,343 B2 | 9/2017 | Kim et al. |
| 10,003,125 B2 | 6/2018 | Yoon et al. |
| 10,797,386 B2 | 10/2020 | Shimada |
| 12,010,255 B2 | 6/2024 | Nam et al. |
| 2013/0257659 A1 | 10/2013 | Darnell et al. |
| 2015/0035706 A1 | 2/2015 | Darnell et al. |
| 2017/0207516 A1* | 7/2017 | Koo .................. H04M 1/0249 |
| 2017/0250460 A1* | 8/2017 | Shin .................... H04M 1/0277 |
| 2018/0175531 A1 | 6/2018 | Kim |
| 2022/0166867 A1 | 5/2022 | Nam et al. |

FOREIGN PATENT DOCUMENTS

| | | | |
|---|---|---|---|
| JP | 2007201918 | A | 8/2007 |
| JP | 5610285 | B2 | 9/2014 |
| JP | 2019165314 | A | 9/2019 |
| KR | 20120017097 | A | 2/2012 |
| KR | 101142043 | B1 | 5/2012 |
| KR | 20140063188 | A | 5/2014 |
| KR | 20140139520 | A | 12/2014 |
| KR | 20150009002 | A | 1/2015 |
| KR | 101587092 | B1 | 1/2016 |
| KR | 20170031518 | A | 3/2017 |
| KR | 20170036360 | A | 4/2017 |
| KR | 20180070433 | A | 6/2018 |
| KR | 101991274 | B1 | 6/2019 |
| KR | 20200101234 | A | 8/2020 |

OTHER PUBLICATIONS

Korean Office Action dated Oct. 28, 2024 for KR Application No. 10-2020-0130369.
[Online], "Contacts for Hi-Rel Connectors: Comparing Technologies", Twin Beam, https://www.techbriefs.com/component/content/article/tb/features/articles/27797 , 11 pages, [No Date].
[Online] "Why Select I-PEX RF Connectors?", https://www.i-pex.com/products/rf, 13 pages [No Date].

* cited by examiner

ELECTRONIC DEVICE COMPRISING ANTENNA

CROSS-REFERENCE TO RELATED APPLICATIONS

This application is a continuation of International Application No. PCT/KR2021/012752, designating the United States, filed on Sep. 17, 2021 in the Korean Intellectual Property Receiving Office, and claiming priority to Korean Patent Application No. 10-2020-0130369 filed on Oct. 8, 2020, in the Korean Intellectual Property Office, the disclosures of all of which are hereby incorporated by reference herein in their entireties.

BACKGROUND

Field

Various example embodiments relate to a connecting structure configured to feed power by being connected to an antenna radiator.

Description of Related Art

As electronic communication technology develops, electronic devices having various functions are appearing. These electronic devices may have a convergence function that performs one or more functions in a complex manner The electronic devices include antennas supporting various frequency bands in order to perform various functions.

Electronic device manufacturers are making efforts to increase the rigidity of electronic devices and slim electronic devices while strengthening design aspects in order to satisfy consumer purchase desires. As part of this trend, electronic devices include metal members in their exteriors, and efforts are being made to utilize some of these metal members as antenna radiators.

An electronic device may include a bracket made of a conductor (e.g., metal) and a printed circuit board on which electronic components for performing various functions of the electronic device are mounted. The bracket and the printed circuit board may be mechanically assembled by being fastened by a fastening portion.

A partial area of the bracket made of a conductor may operate as an antenna radiator of the electronic device. When a connecting portion connecting the bracket and the printed circuit board is also made of a conductor, a conductive structure may be provided between the ground of the printed circuit board and the bracket.

When the bracket and the printed circuit board are not adjacent, it may not be possible to connect the bracket and the printed circuit board by using screws. In addition, when the metal material of a screw and the metal material of the portion connected to the screw are different, galvanic corrosion may occur. When the fastening element is a screw, there may be a restriction when it is necessary to remove the screw. Alternatively, it may be difficult to provide the bracket with portions in which screws are to be disposed. When a structure in which screws are to be disposed is included, there may be restrictions on the arrangement of electronic components inside the electronic device.

SUMMARY

According to various example embodiments, an electronic device may include a structure configured to connect, directly or indirectly, a printed circuit board to a conductor without screws.

An electronic device according to various example embodiments may include a housing including a first surface facing a first direction, a second surface facing a second direction opposite to the first direction, and a third surface surrounding a space defined by the first surface and the second surface, a metal inclusive frame defining at least one area of the housing, wherein the metal inclusive frame includes a groove provided at a first point, a flexible printed circuit board (FPCB) disposed in an inner space of the housing, a conductive connecting member coupled to the FPCB, wherein the conductive connecting member may include a first portion fixed to an area of the FPCB, and a second portion having elasticity, and a wireless communication circuit disposed on, directly or indirectly, the FPCB or electrically connected, directly or indirectly, to the FPCB. At least a portion of the second portion of the conductive connecting member may be inserted into the groove of the metal inclusive frame, and the wireless communication circuit may be configured to transmit/receive a signal of a predetermined frequency band by feeding power to the metal inclusive frame at the first point via the FPCB and the conductive connecting member.

According to an example embodiment, an electronic device may include a housing including a first housing and a second housing coupled to the first housing to be movable with respect to the first housing, wherein the housing may include a connecting portion provided at the first point, at least one flexible printed circuit board (FPCB) disposed in an inner space of the housing, a conductive connecting member coupled to the FPCB, wherein the conductive connecting member may include a first portion fixed to an area of the FPCB, and a second portion having elasticity, and a wireless communication circuit disposed on, directly or indirectly, the FPCB or electrically connected, directly or indirectly, to the FPCB. The conductive connecting member may be coupled to the second housing by bringing the second portion into contact with the connecting portion, when the first housing and the second housing are coupled in a first state, the FPCB may be disposed at a first position. When the second housing is moved relative to the first housing in the first state and the first housing and the second housing are coupled in a second state, the FPCB may be disposed at a second position, and the second portion of the conductive connecting member may come into contact with the first housing. The wireless communication circuit may be configured to transmit/receive a first signal of a first frequency band by feeding power to the second housing in the first state, and to transmit/receive a second signal of a frequency band by feeding power to the first housing and the second housing in the second state.

An electronic device according to an example embodiment may include a flexible printed circuit board (FPCB) disposed inside the housing, a wireless communication circuit disposed on, directly or indirectly, the FPCB or electrically connected to the FPCB, a conductive connecting member connected to one end of the FPCB, and a metal member including a connecting portion configured to be coupled to the conductive connecting member. The wireless communication circuit may transmit/receive a signal by feeding power to the metal member via the conductive connecting member.

According to various example embodiments, it is possible to ensure radiation performance of an antenna by overcoming a layout limitation caused by a fastening structure that connects a printed circuit board to an antenna radiator.

BRIEF DESCRIPTION OF DRAWINGS

The above and other aspects, features and advantages of certain embodiments will be more apparent from the following detailed description, taken in conjunction with the accompanying drawings, in which.

DETAILED DESCRIPTION

Figure 1:
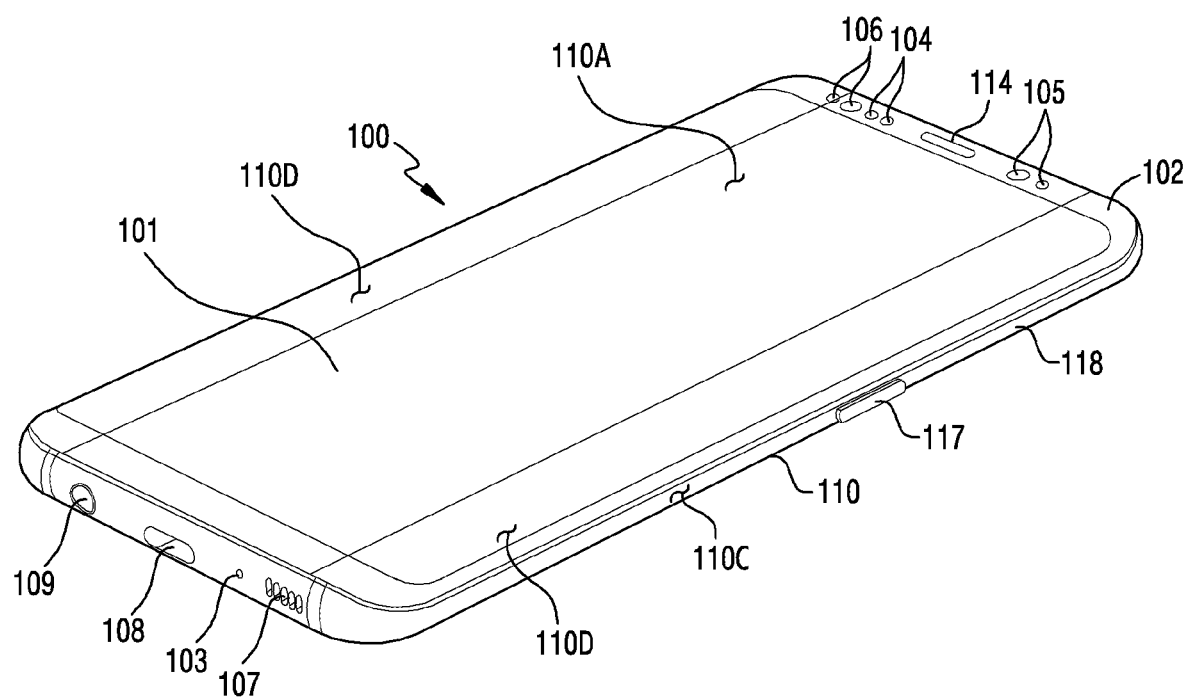
FIG. 1 is a front perspective view of a mobile electronic device according to an example embodiment.
Figure 2:
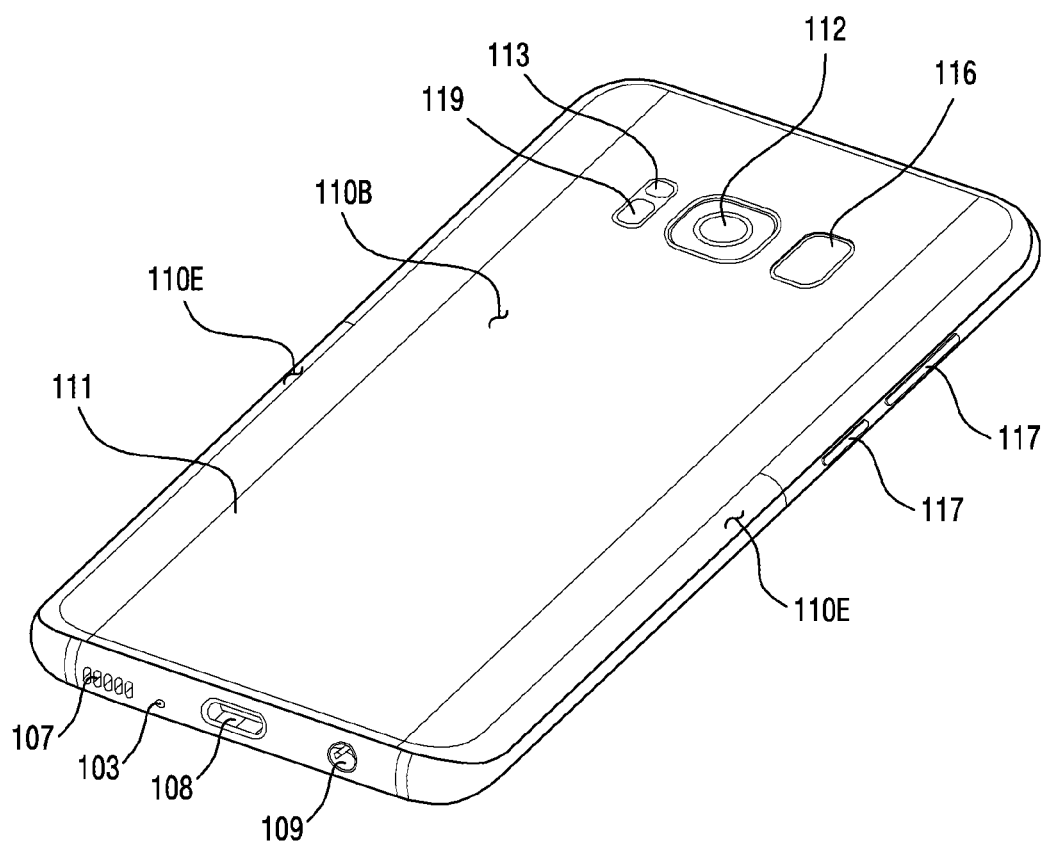
FIG. 2 is a rear perspective view of the electronic device of FIG. 1.

Referring to FIGS. 1 and 2, the electronic device 100 according to an embodiment may include a housing 110 including a first surface (or a front surface) 110A, a second surface (or a rear surface) 110B, and a side surface 110C surrounding the space between the first surface 110A and the second surface 110B. In another embodiment (not illustrated), the term "housing" may refer to a structure defining some of the first surface 110A, the second surface 110B, and the side surface 110C of FIG. 1. According to an embodiment, at least a portion of the first surface 110A may be configured with a substantially transparent front surface plate 102 (e.g., a glass plate or a polymer plate including various coating layers). The second surface 110B may be configured with a substantially opaque rear surface plate 111. The rear surface plate 111 may be made of, for example, coated or colored glass, ceramic, polymer, metal (e.g., aluminum, stainless steel (STS), or magnesium), or a combination of two or more of these materials. The side surface 110C may be configured with a side surface bezel structure (or a "side surface member") 118 coupled to the front surface plate 102 and the rear surface plate 111 and including metal and/or polymer. In some embodiments, the rear surface plate 111 and the side surface bezel structure 118 may be integrally configured and may include the same material (e.g., a metal material such as aluminum).

In the illustrated embodiment, the front surface plate 102 may include two first areas 110D, which are bent from the first surface 110A toward the rear surface plate 111 and extend seamlessly, at the long opposite side edges thereof. In the illustrated embodiment (see FIG. 2), the rear surface plate 111 may include, at the long opposite side edges thereof, two second areas 110E, which are bent from the second surface 110B toward the front surface plate 102 and extend seamlessly. In some embodiments, the front surface plate 102 (or the rear surface plate 111) may include only one of the first areas 110D (or the second areas 110E). In another embodiment, some of the first areas 110D or the second areas 110E may not be included. In the above-described embodiments, in the side surface of the electronic device 100, the side surface bezel structure 118 may have a first thickness (or width) on the side where the first areas 110D or the second areas 110E are not included, and may have a second thickness, which is thinner than the first thickness, on the side where the first areas 110D or the second areas 110E are included.

According to an embodiment, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments, in the electronic device 100, at least one of the components (e.g., the key input devices 117 or the light-emitting elements 106) may be omitted, or other components may be additionally included.

The display 101 may be exposed through a substantial portion of, for example, the front surface plate 102. In some embodiments, at least a portion of the display 101 may be exposed through the front surface plate 102 providing the first surface 110A and the first areas 110D of the side surface 110C. In some embodiments, the edges of the display 101 may be configured to be substantially the same as the shape of the periphery of the front surface plate 102 adjacent thereto. In another embodiment (not illustrated), the distance between the periphery of the display 101 and the periphery of the front surface plate 102 may be substantially constant in order to enlarge the exposed area of the display 101.

In another embodiment (not illustrated), recesses or openings may be provided in a portion of the screen display area of the display 101, and one or more of the audio module 114, the sensor modules 104, the camera modules 105, and the light-emitting elements 106, which are aligned with the recesses or the openings, may be included. In another embodiment (not illustrated), the rear surface of the screen display area of the display 101 may include at least one of audio modules 114, sensor modules 104, camera modules 105, a fingerprint sensor 116, and light-emitting elements 106. In another embodiment (not illustrated), the display 101 may be coupled to or disposed adjacent to a touch-sensitive circuit, a pressure sensor capable of measuring a touch intensity (pressure), and/or a digitizer configured to detect an electromagnetic field-type stylus pen. In some embodiments, at least some of the sensor modules 104 and 119 and/or at least some of the key input devices 117 may be disposed in the first areas 110D and/or the second areas 110E.

The audio modules 103, 107, and 114 may include a microphone hole 103 and speaker holes 107 and 114. The microphone hole 103 may include a microphone disposed therein to acquire external sound, and in some embodiments, a plurality of microphones may be disposed therein to be able to detect the direction of sound. The speaker holes 107 and 114 may include an external speaker hole 107 and a communication receiver hole 114. In some embodiments, the speaker holes 107 and 114 and the microphone hole 103 may be implemented as a single hole, or a speaker may be included without the speaker holes 107 and 114 (e.g., a piezo speaker).

The sensor modules 104, 116, and 119 may generate electrical signals or data values corresponding to an internal operating state of the electronic device 100 or an external environmental state. The sensor modules 104, 116, and 119 may include, for example, a first sensor module 104 (e.g., a proximity sensor) and/or a second sensor module (not illustrated) (e.g., a fingerprint sensor) disposed on the first surface 110A of the housing 110, and/or a third sensor module 119 (e.g., an HRM sensor) and/or a fourth sensor module 116 (e.g., a fingerprint sensor) disposed on the second surface 110B of the housing 110. The fingerprint sensor may be disposed not only on the first surface 110A of the housing 110 (e.g., the display 101), but also on the second surface 110B. The electronic device 100 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105, 112, and 113 may include a first camera device 105 disposed on the first surface 110A of the electronic device 100, and a second camera device 112 and/or a flash 113 disposed on the second surface 110B of the electronic device 100. The camera devices 105 and 112 may include one or more lenses, an image sensor, and/or an image signal processor. The flash 113 may include, for example, a light-emitting diode or a xenon lamp. In some embodiments, two or more lenses (e.g., an infrared camera lens, a wide-angle lens, and a telephoto lens) and image sensors may be disposed on, directly or indirectly, one surface of the electronic device 100.

The key input devices 117 may be disposed on, directly or indirectly, the side surface 110C of the housing 110. In another embodiment, the electronic device 100 may not include some or all of the above-mentioned key input devices 117, and a key input devices 117, which is not included, may be implemented in another form, such as a soft key, on the display 101. In some embodiments, the key input devices may include a sensor module 116 disposed on, directly or indirectly, the second surface 110B of the housing 110.

The light-emitting element 106 may be disposed, for example, on the first surface 110A of the housing 110. The light-emitting elements 106 may provide, for example, the state information of the electronic device 100 in an optical form. In another embodiment, the light-emitting elements 106 may provide a light source that is interlocked with, for example, the operation of the camera module 105. The light-emitting elements 106 may include, for example, an LED, an IR LED, and a xenon lamp.

The connector holes 108 and 109 may include a first connector hole 108, which is capable of accommodating a connector (e.g., a USB connector) for transmitting/receiving power and/or data to/from an external electronic device, and/or a second connector hole (e.g., an earphone jack) 109, which is capable of accommodating a connector for transmitting/receiving an audio signal to/from an external electronic device.

Figure 3:
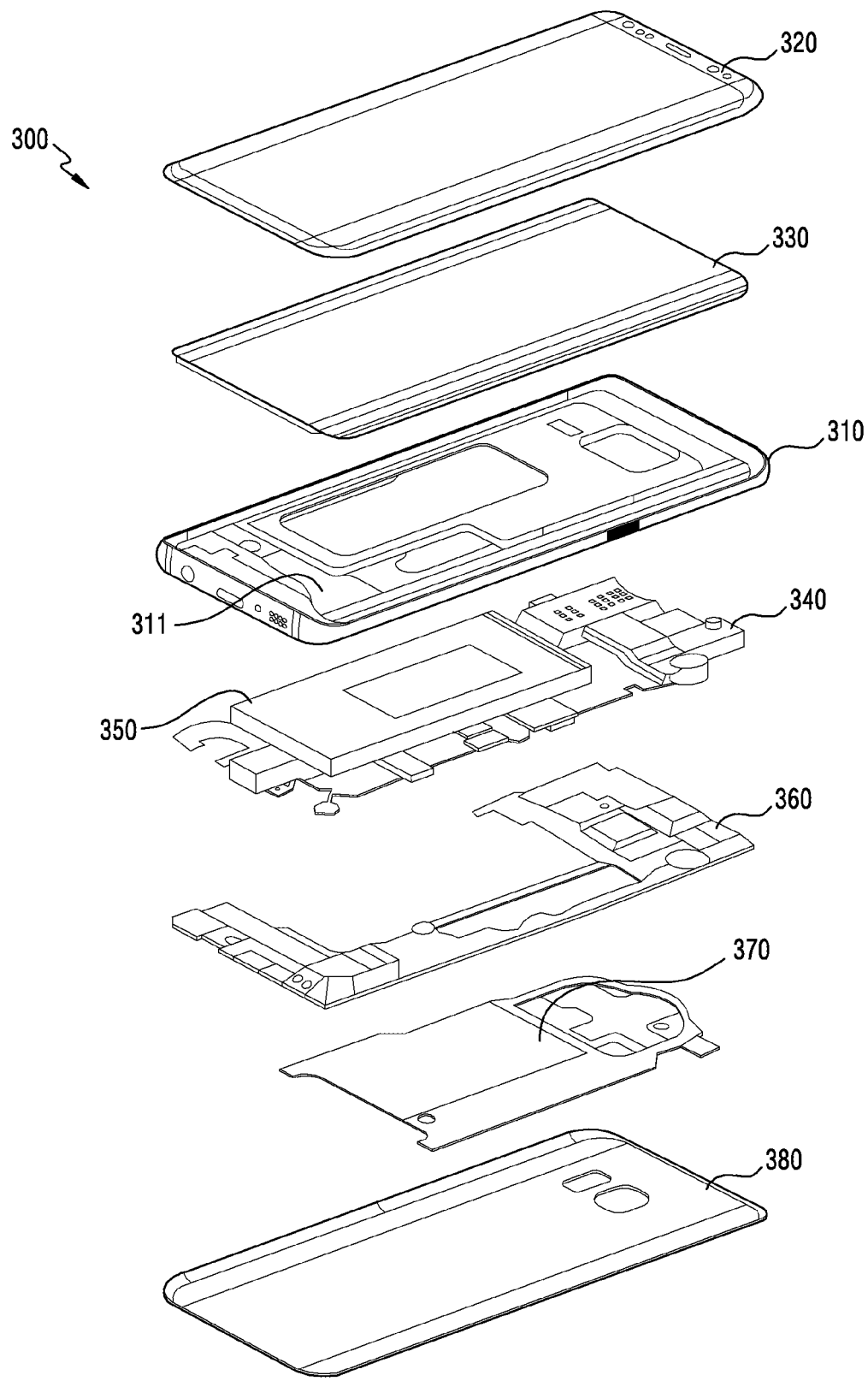
FIG. 3 is an exploded perspective view of the electronic device of FIG. 1.

Referring to FIG. 3, an electronic device 300 may include a side surface bezel structure 310, a first support member 311 (e.g., a bracket), a front surface plate 320, a display 330, a printed circuit board 340, a battery 350, a second support member 360 (e.g., a rear case), an antenna 370, and a rear surface plate 380. In some embodiments, at least one of the components (e.g., the first support member 311 or the second support member 360) may be omitted from the electronic device 300, or other components may be additionally included in the electronic device 101. At least one of the components of the electronic device 300 may be the same as or similar to at least one of the components of the electronic device 100 of FIG. 1 or 2, and a redundant description thereof will be omitted below.

The first support member 311 may be disposed inside the electronic device 300 to be connected to the side surface bezel structure 310, or may be configured integrally with the side surface bezel structure 310. The first support member 311 may be made of, for example, a metal material and/or a non-metal (e.g., polymer) material. The first support member 311 may have one surface to which the display 330 is coupled, and the other surface to which the printed circuit board 340 is coupled. A processor, memory, and/or interface may be mounted on the printed circuit board 340. The processor may include one or more of, for example, a central processing unit, an application processor, a graphics processor, an image signal processor, a sensor hub processor, or a communication processor.

The memory may include, for example, volatile memory or nonvolatile memory.

The interface may include, for example, a high-definition multimedia interface (HDMI), a universal serial bus (USB) interface, an SD card interface, and/or an audio interface. The interface may electrically or physically connect, for example, the electronic device 300 to an external electronic device and may include a USB connector, an SD card/an MMC connector, or an audio connector.

The battery 350 is a device for supplying power to at least one component of the electronic device 300 and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed inside the electronic device 300 or may be detachably disposed on the electronic device 300.

The antenna 370 may be disposed between the rear surface plate 380 and the battery 350. The antenna 370 may include, for example, a near-field communication (NFC) antenna, a wireless charging antenna, and/or a magnetic secure transmission (MST) antenna. For example, the antenna 370 may execute short-range communication with an external device or may transmit/receive power required for charging to/from the external device in a wireless manner. In another embodiment, an antenna structure may be configured by a portion of the side surface bezel structure 310 and/or a portion of the first support member 311, or a combination thereof.

Figure 4A:
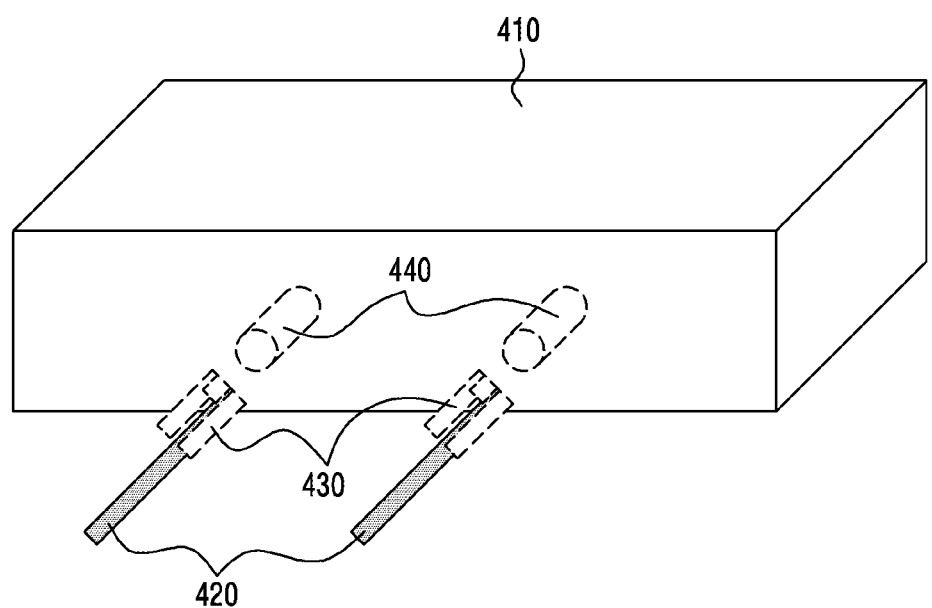
FIG. 4A is a perspective view illustrating an FPCB coupled to a metal frame according to an example embodiment.
Figure 4B:
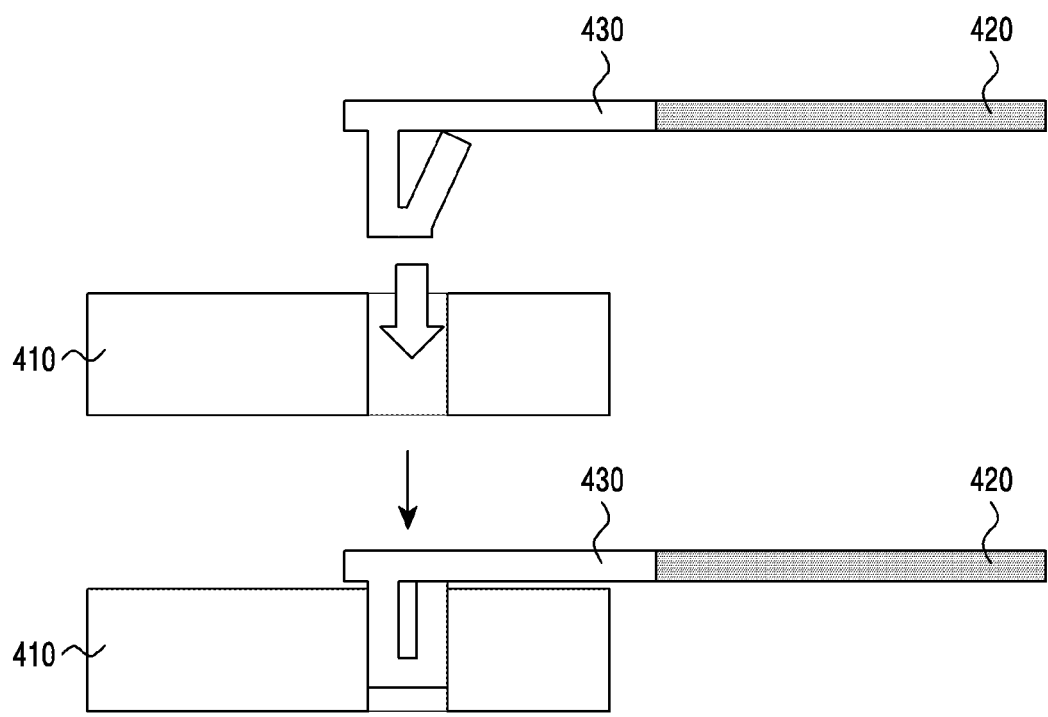
FIG. 4B is a cross-sectional view illustrating an FPCB coupled to a metal frame according to an example embodiment.

FIG. 4A is a perspective view illustrating an FPCB coupled to a metal frame according to an embodiment. FIG. 4B is a cross-sectional view illustrating an FPCB coupled to a metal frame according to an embodiment.

Referring to FIGS. 1, 4A, and 4B together, an electronic device 100 according to an embodiment may include a metal frame 410 (e.g., the side surface bezel structure 118 of FIG. 1), at least one groove 440 provided in the metal frame, a flexible printed circuit board (FPCB) 420 disposed inside the electronic device, and a conductive connecting member 430.

According to an embodiment, the electronic device 100 may include a housing 110 that defines the exterior of the electronic device 100. According to an embodiment, the electronic device 100 may include a metal frame 410 defining at least one area of the housing 110 and at least one groove 440 provided in one area of the metal frame. According to an embodiment, the electronic device 100 may include an FPCB 420 disposed therein and a conductive connecting member 430 coupled to the FPCB 420.

According to an embodiment, at least one groove 440 may be provided at least one point of the metal frame 410. According to an embodiment, the at least one groove 440 may include a cylindrical shape. For example, the at least one groove 440 may include a square pillar or triangular pillar shape, but is not limited thereto.

According to an embodiment, at least a portion of the conductive connecting members 430 may have elasticity. According to an embodiment, the conductive connecting member 430 may include a metal member having elasticity (e.g., steel use stainless (SUS)). According to an embodiment, a portion of the conductive connecting member 430 may include a shape corresponding to the at least one groove 440. For example, when the at least one groove 440 has a cylindrical shape, a portion of the conductive connecting member 430 may have a cylindrical shape corresponding to the cylinder, but is not limited thereto. According to an embodiment, a portion of the conductive connecting member 430 may be inserted into the at least one groove 440. According to an embodiment, one end of the conductive connecting member 430 may be inserted into the at least one groove 440 and the other portion may be coupled to the FPCB 420. According to an embodiment, the shape of the conductive connecting member 430 may be deformed while being inserted into the at least one groove 440. For example, a portion of the conductive connecting member 430 may have elasticity and may be inserted after being deformed into a shape corresponding to at least one groove 440.

According to an embodiment, a wireless communication circuit (not illustrated) disposed inside the electronic device 100 may be electrically connected, directly or indirectly, to the FPCB 420. According to an embodiment, the wireless communication circuit may be electrically connected to the metal frame 410 via the FPCB 420 and the conductive connecting member 430. According to an embodiment, the wireless communication circuit may feed power to the metal frame 410 via the FPCB 420 and the conductive connecting member 430. According to an embodiment, the wireless communication circuit may transmit or receive a signal of a predetermined frequency band by feeding power to the metal frame 410.

Figure 5A:
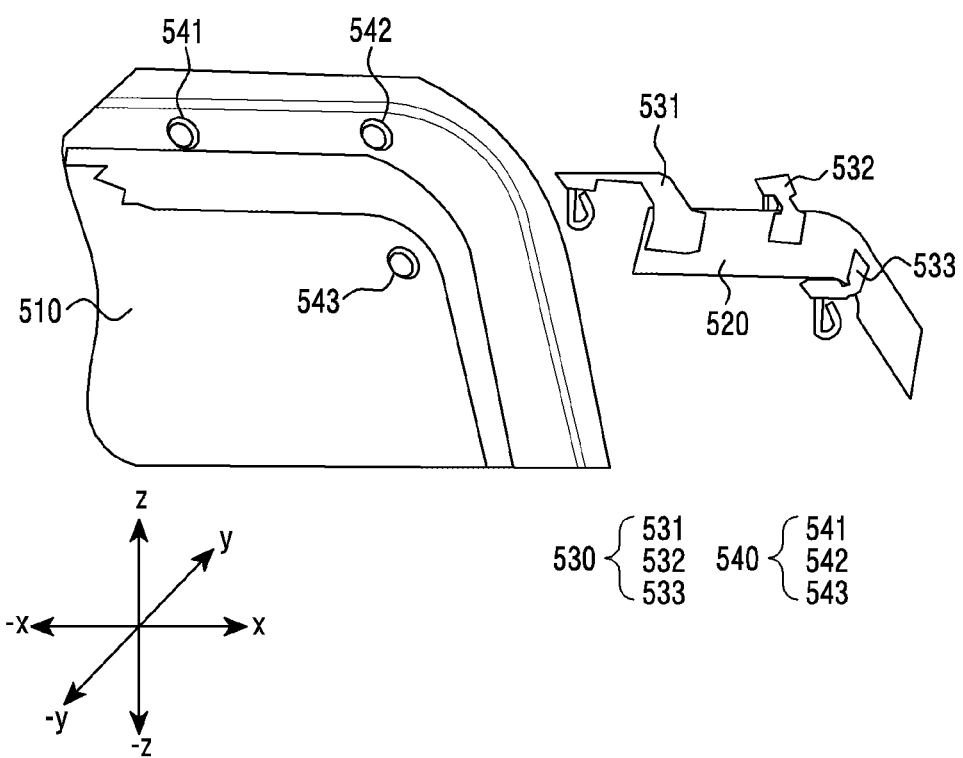
FIG. 5A is a perspective view illustrating an FPCB coupled to a metal frame by vertically inserting a plurality of conductive connecting members into the metal frame according to an example embodiment.
Figure 5B:
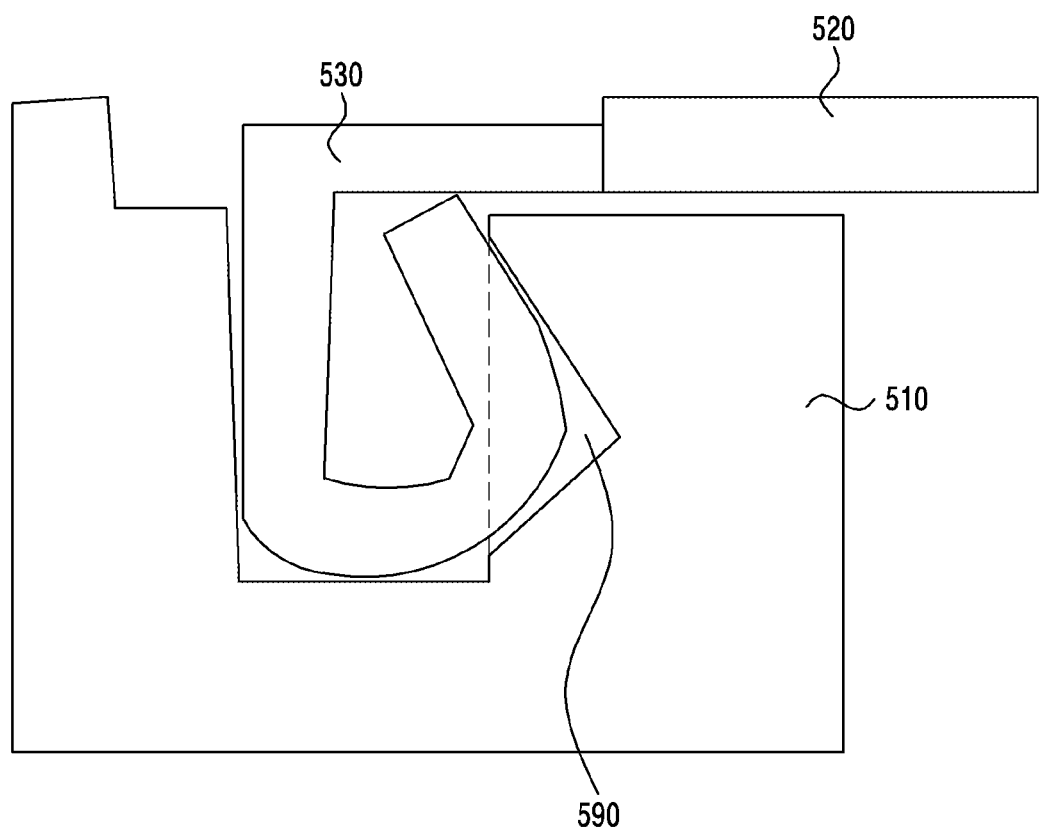
FIG. 5B is a cross-sectional view illustrating an FPCB coupled to a metal frame by vertically inserting a conductive connecting member into the metal frame according to an example embodiment.

FIG. 5A is a perspective view illustrating an FPCB coupled to a metal frame by vertically inserting a plurality of conductive connecting members into the metal frame according to an embodiment. FIG. 5B is a cross-sectional view illustrating an FPCB coupled to a metal frame by inserting a conductive connecting member into the metal frame according to an embodiment.

Referring to FIGS. 1, 5A, and 5B together, an electronic device 100 according to an embodiment may include a housing 110 defining the exterior of the electronic device 100, a metal frame 510 (e.g., the metal frame 410 of FIG. 4A) defining a portion of the housing 110, at least one groove 540 (e.g., the at least one groove 440 of FIG. 4A) provided at least one point of the metal frame 510, an FPCB 520 (e.g., the FPCB 420 of FIG. 4A) disposed inside the electronic device 100, or at least one conductive connecting member 530 coupled to the FPCB 520 (e.g., the conductive connecting member 430 in FIG. 4A). The same reference numerals are used for substantially the same components, and redundant descriptions will be omitted.

According to an embodiment, the FPCB 520 may be electrically connected to the metal frame 510. According to an embodiment, the FPCB 520 may be electrically connected to the metal frame 510 via the conductive connecting member 530. According to an embodiment, a first portion of the conductive connecting member 530 may be coupled to the FPCB 520 and a second portion of the conductive connecting member 530 may be in contact with the at least one groove 540. For example, the FPCB 520 may be electrically connected to the metal frame 510 by inserting a first conductive connecting member 531 into a first groove 541 and inserting a second conductive connecting member 532 into a second groove 542.

According to an embodiment, the electronic device 100 may include a housing including a first surface (e.g., the first surface 110A in FIG. 1) facing a first direction, a second surface (e.g., the second surface 110B in FIG. 1) facing a direction opposite to the first direction, and a side surface (e.g., the side surface 110C of FIG. 1) connected to the first surface and the second surface and facing a third direction. According to an embodiment, the at least one groove 540 may be provided in a direction (e.g., the +y direction) substantially perpendicular to the side surface. For example, the at least one groove 540 may be provided in at least one area of the metal frame 510 in a direction substantially perpendicular to the side surface of the housing. For example, the at least one groove 540 may be provided in a direction substantially perpendicular to the side surface of the housing, and the conductive connecting member 530 may be inserted into the at least one groove 540 of the housing.

According to an embodiment, the metal frame 510 may include at least one groove 540 in at least one area. According to an embodiment, the metal frame 510 may include at least one groove 540 including at least one protrusion 590 toward the inside of the electronic device 100. According to an embodiment, the conductive connecting member 530, which is inserted into the groove 540 including the at least one protrusion 590, may be prevented or reduced from being released by the at least one protrusion 590 after being coupled to the groove 540.

Figure 6A:
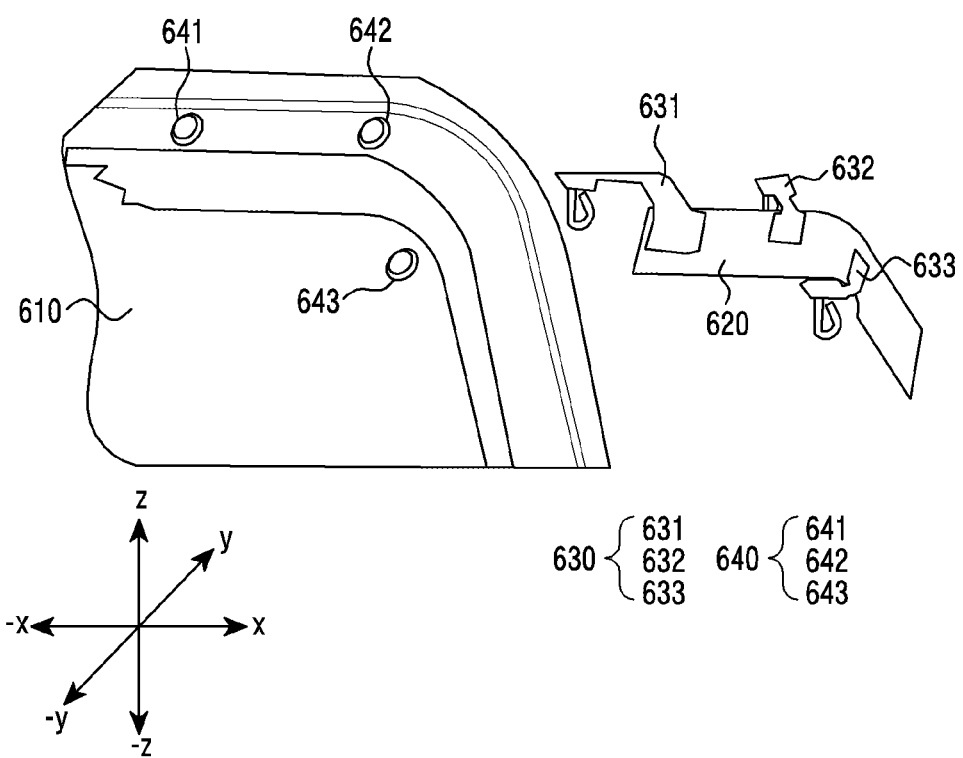
FIG. 6A is a perspective view illustrating an FPCB coupled to a metal frame by horizontally inserting a plurality of conductive connecting members into the metal frame according to an example embodiment.
Figure 6B:
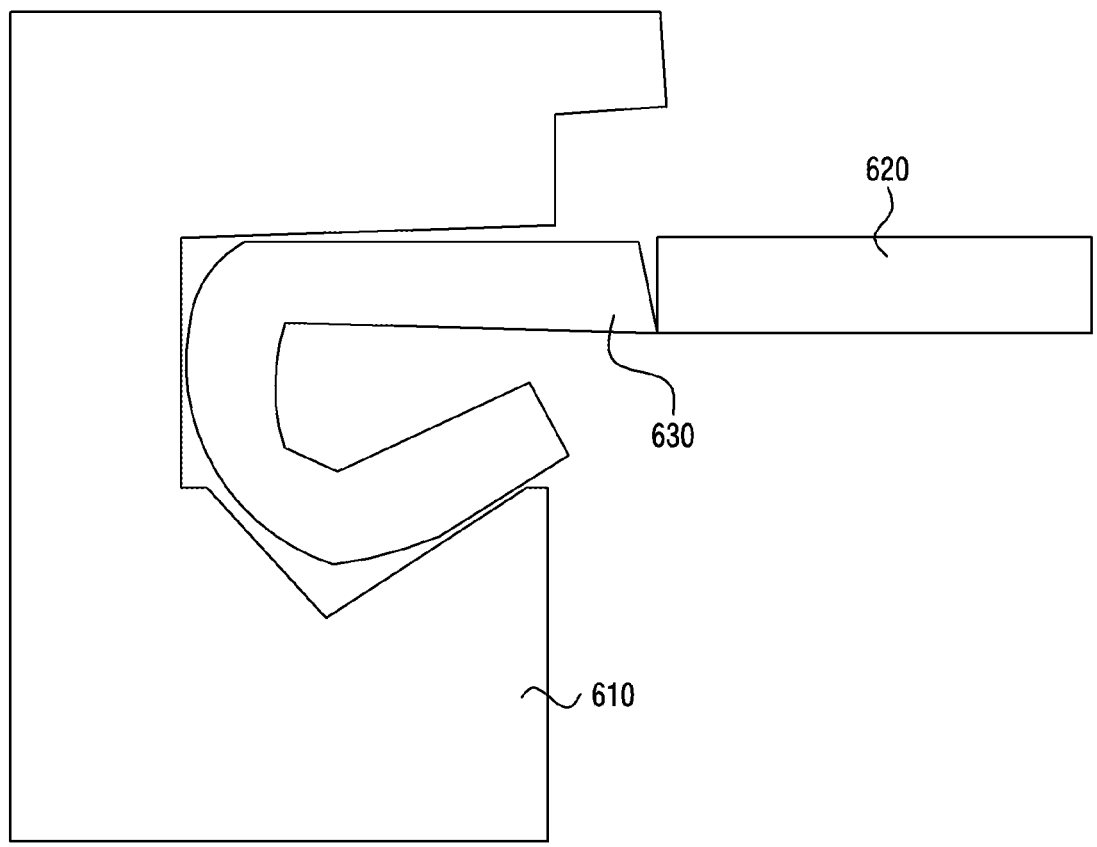
FIG. 6B is a cross-sectional view illustrating an FPCB coupled to a metal frame by horizontally inserting a conductive connecting member into the metal frame according to an example embodiment.

FIG. 6A is a perspective view illustrating an FPCB coupled to a metal frame by horizontally inserting a plurality of conductive connecting members into the metal frame according to an embodiment. FIG. 6B is a cross-sectional view illustrating an FPCB coupled to a metal frame by horizontally inserting a conductive connecting member into the metal frame according to an embodiment.

Referring to FIGS. 1, 6A, and 6B together, an electronic device 100 according to an embodiment may include a housing 110 defining the exterior of the electronic device 100, a metal frame 610 defining a portion of the housing 110, at least one groove 640 provided at at least one point of the metal frame 610, an FPCB 620 disposed inside the electronic device 100, or at least one conductive connecting member 630 coupled to the FPCB 620. The same reference numerals are used for substantially the same components, and redundant descriptions will be omitted.

According to an embodiment, an electronic device 100 may include a housing including a first surface (e.g., the first surface 110A in FIG. 1) facing a first direction (e.g., the +z direction), a second surface (e.g., the second surface 110B in FIG. 1) facing a direction opposite to the first direction, and a side surface (e.g., the side surface 110C of FIG. 1) connected to the first surface and the second surface and facing a third direction. According to an embodiment, the at least one groove 640 may be provided in a direction (e.g., the −x direction) parallel to the side surface. According to an embodiment, the at least one groove 640 may be provided in at least one area of the metal frame 610 in a direction substantially parallel to the side surface of the housing. For example, the at least one groove 640 may be provided in a direction (e.g., the +x direction) substantially perpendicular to the side surface of the housing, and at least one conductive connecting member 630 may be inserted into the at least one groove in a direction substantially perpendicular to the side surface of the housing. However, the angle formed by the at least one groove 640 with the side surface is not limited thereto.

According to an embodiment, the FPCB 620 may be electrically connected to the metal frame 610 by inserting a first conductive connecting member 631 into the first groove 641, inserting a second conductive connecting member 632 into the second groove 642, and inserting a third conductive connecting member 633 into the third groove 643.

Figure 7A:
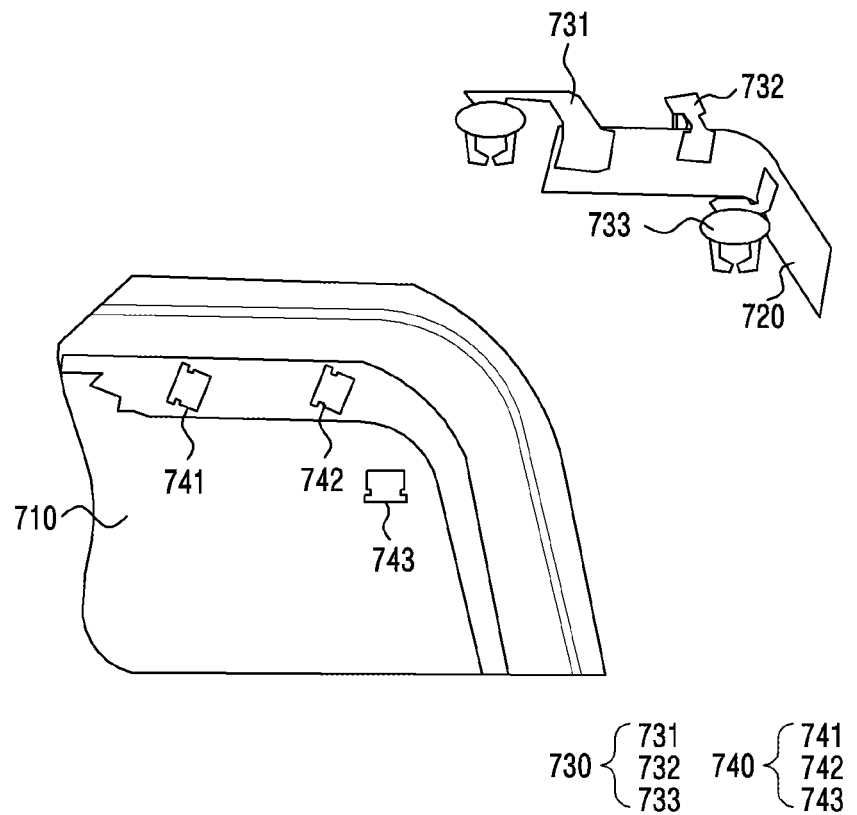
FIG. 7A is a perspective view illustrating an FPCB coupled to protrusions of a metal frame via a plurality of conductive connecting members according to an example embodiment.
Figure 7B:
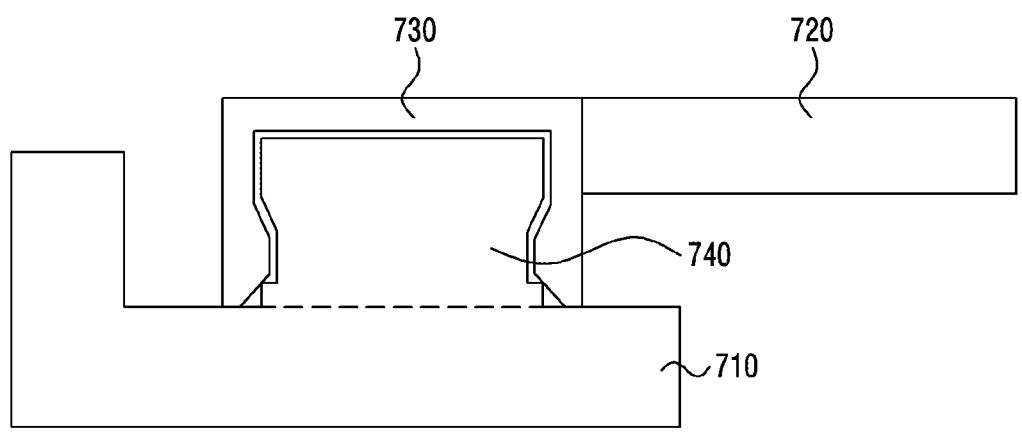
FIG. 7B is a cross-sectional view illustrating an FPCB coupled to a protrusion of a metal frame via a conductive connecting member according to an example embodiment.

FIG. 7A is a perspective view illustrating an FPCB coupled to protrusions of a metal frame via a plurality of conductive connecting members according to an embodiment. FIG. 7B is a cross-sectional view illustrating an FPCB coupled to a protrusion of a metal frame via a conductive connecting member according to an embodiment.

Referring to FIGS. 7A and 7B together, a metal frame 710 according to an embodiment may include at least one protrusion 740. According to an embodiment, at least one conductive connecting member 730 may be coupled to an FPCB 720. The same reference numerals are used for substantially the same components, and redundant descriptions will be omitted.

According to an embodiment, the at least one protrusion 740 may include the same metal (e.g., SUS) as the metal frame 710. According to an embodiment, the at least one protrusion 740 may have a larger area as the vertical distance from the surface that is to come into contact with the metal frame 710 increases. According to another embodiment, at least a portion of the cross section of the at least one protrusion 740 may include an area equal to or smaller than that of the cross section where the at least one protrusion 740 is disposed. For example, at least one protrusion 740 may have an inverted-horn shape. According to an embodiment, the at least one protrusion 740 may include at least one groove in one area.

According to an embodiment, the conductive connecting member 730 may include a hook shape. According to an embodiment, the conductive connecting member 730 may include a shape corresponding to the at least one protrusion 740. For example, the conductive connecting member 730 may be configured to enclose the at least one protrusion 740. For example, the conductive connecting member 730 may have a c-clip shape, but is not limited thereto. According to an embodiment, the conductive connecting member 730 may include a shape corresponding to the groove included in the at least one protrusion 740. For example, the conductive connecting member 730 may have a shape corresponding to the groove included in the at least one protrusion 740 to be prevented or reduced from being released when coupled to the at least one protrusion 740.

According to an embodiment, the FPCB 720 may be electrically connected to the metal frame 710 by coupling at least one conductive connecting member 730 with the at least one protrusion 740. For example, the FPCB 720 may be electrically connected to the metal frame 710 by coupling a first conductive connecting member 731 to the first protrusion 741, coupling a second conductive connecting member 732 to the second protrusion 742, and coupling a third conductive connecting member 733 to the third protrusion 743.

Figure 8A:
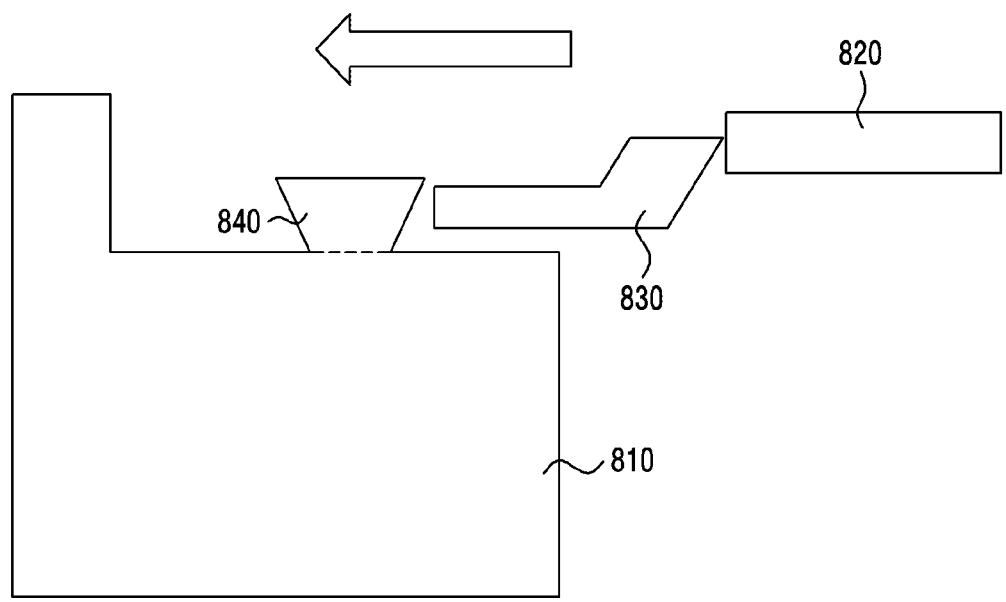
FIG. 8A is a plan view illustrating an FPCB coupled to a protrusion of a metal frame via a conductive connecting member according to another example embodiment.
Figure 8B:
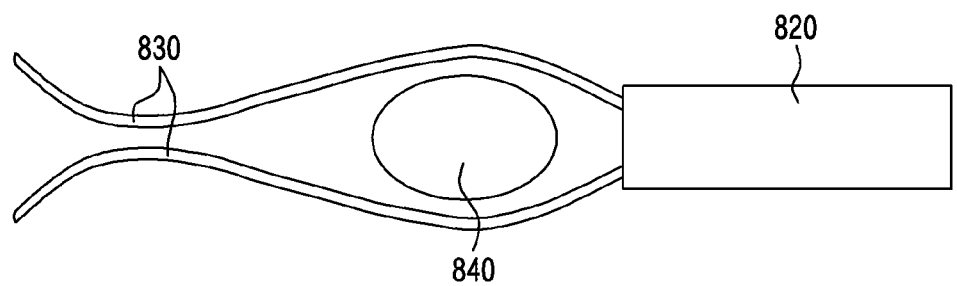
FIG. 8B is a cross-sectional view illustrating a conductive connecting member coupled to a protrusion of a metal frame according to an example embodiment.

FIG. 8A is a cross-sectional view illustrating an FPCB coupled to a protrusion of a metal frame via a conductive connecting member according to another embodiment. FIG. 8B is a plan view illustrating a conductive connecting member coupled to a protrusion of a metal frame according to an embodiment. The same reference numerals are used for substantially the same/similar components, and redundant descriptions will be omitted.

Referring to FIG. 8A, a metal frame 810 according to an embodiment may include a protrusion 840 at at least one point. According to an embodiment, at least a portion of the at least one protrusion 840 may have a wider cross-sectional area as the vertical distance from the surface that is to come into contact with the metal frame 810 increases. For example, at least one protrusion 840 may have an inverted-horn shape.

According to an embodiment, a conductive connecting member 830 may be coupled to the protrusion 840. According to an embodiment, the conductive connecting member 830 may be electrically connected to the protrusion 840 while enclosing the protrusion 840. According to an embodiment, one end of the conductive connecting member 830 may be electrically connected to the protrusion 840 and the other end may be connected to the FPCB 820. According to an embodiment, the FPCB 820 may be electrically connected to the metal frame 810 via the conductive connecting member 830 and the protrusion 840.

Referring to FIGS. 8A and 8B together, the conductive connecting member 830 according to an embodiment may have a shape of tongs. According to an embodiment, the conductive connecting member 830 may include two elastic portions. For example, the conductive connecting member 830 may include two portions, and the distance between the two portions may be variable. According to an embodiment, the distance between the two portions of the conductive connecting member 830 may increase when coupled with the protrusion 840 and decrease after being coupled.

In an embodiment, the two portions may include a first portion and a second portion. The shapes of the first portion and the second portion may be symmetrical. The first portion and the second portion may be made of an elastic material. The first portion and the second portion may be shaped to surround at least a portion of the protrusion 840.

Figure 9A:
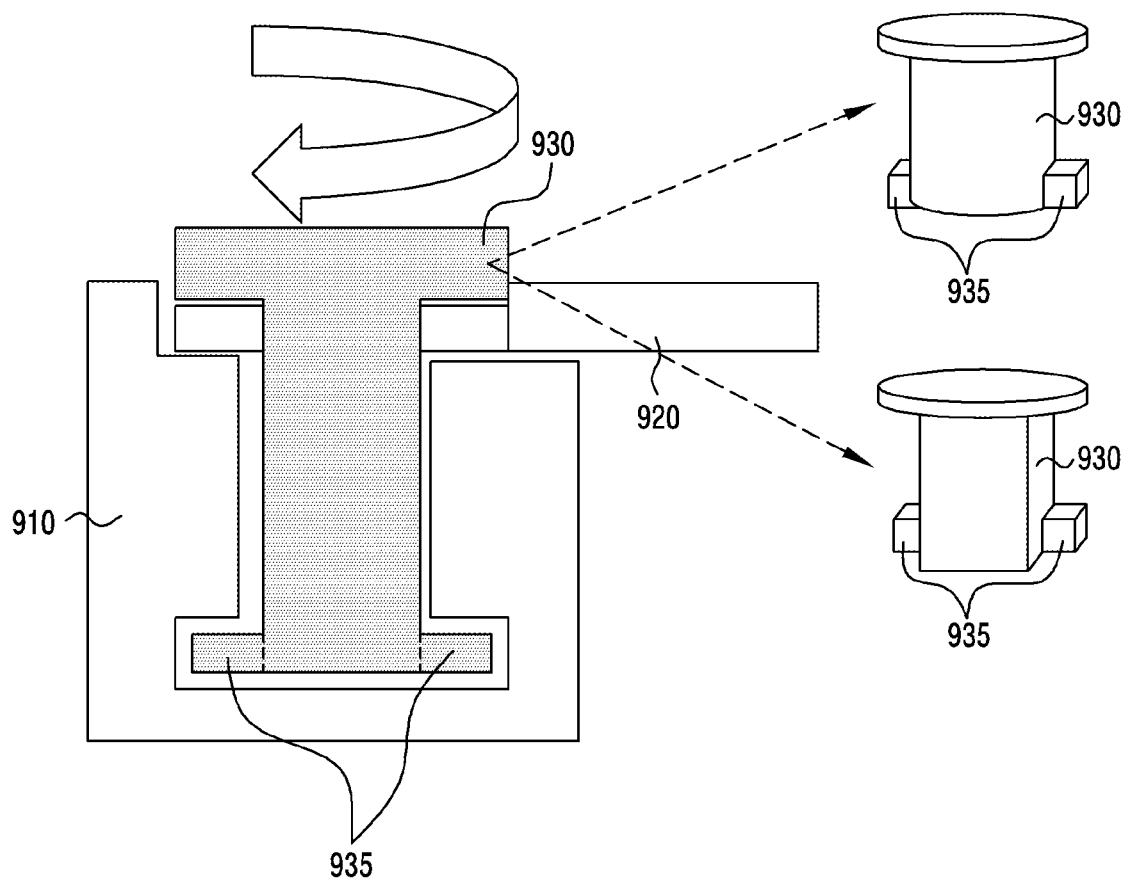
FIG. 9A illustrates a rotatable conductive connecting member that is coupled to a metal frame according to an example embodiment.
Figure 9B:
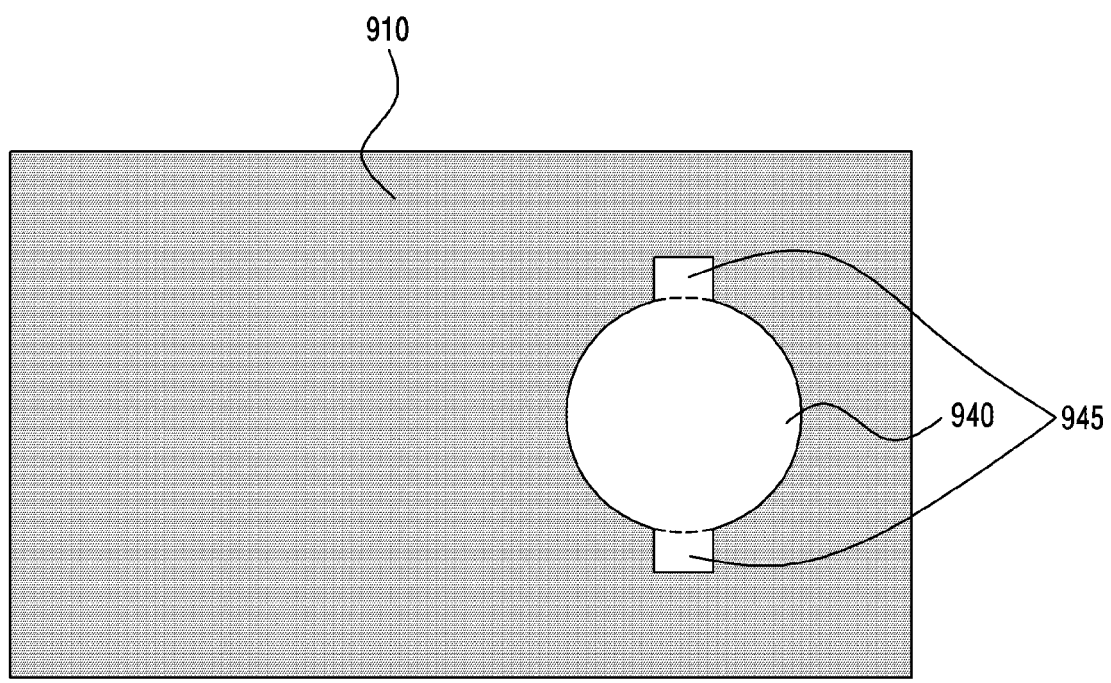
FIG. 9B is a cross-sectional view illustrating a groove of a metal frame that is couplable to a rotatable conductive connecting member according to an example embodiment.

FIG. 9A illustrates a rotatable conductive connecting member that is coupled to a metal frame according to an embodiment. FIG. 9B is a cross-sectional view illustrating a groove of a metal frame that is couplable to a rotatable conductive connecting member according to an embodiment.

Referring to FIGS. 9A and 9B together, the conductive connecting member 930 according to an embodiment may be inserted into a groove 940 provided at one point of the metal frame 910.

Referring to FIG. 9B, the metal frame 910 according to an embodiment may include a groove 940 in one area. The groove 940 according to an embodiment may include at least one fastening portion 945. For example, the groove 940 may include a circular shape, and a plurality of fastening portions 945 may be symmetrically arranged.

Referring to FIG. 9A, the conductive connecting member 930 according to an embodiment may be coupled to one end of an FPCB 920. According to an embodiment, the conductive connecting member 930 may include at least one protrusion 935 at one end. According to an embodiment, the conductive connecting member 930 may have a cylindrical shape. According to another embodiment, the conductive connecting member 930 may have a rectangular parallelepiped shape.

According to an embodiment, at least one protrusion 935 included in the conductive connecting member 930 may have a shape corresponding to at least one fastening portion 945 included in the groove 940. According to an embodiment, the conductive connecting member 930 may be inserted into the groove 940 such that the at least one protrusion 935 corresponds to the at least one fastening portion 945.

According to an embodiment, the conductive connecting member 930 may be rotated by a predetermined angle. According to an embodiment, the conductive connecting member 930 may be rotated by a predetermined angle after being inserted into the groove 940 included in the metal frame 910. For example, the conductive connecting member 930 may be rotated about 90 degrees after being inserted into the groove 940 such that the protrusion 935 and the fastening portion 945 correspond to each other. As the conductive connecting member 930 according to an embodiment is rotated after being inserted into the groove 940, the conductive connecting member 930 may be coupled to the metal frame 910.

Figure 10A:
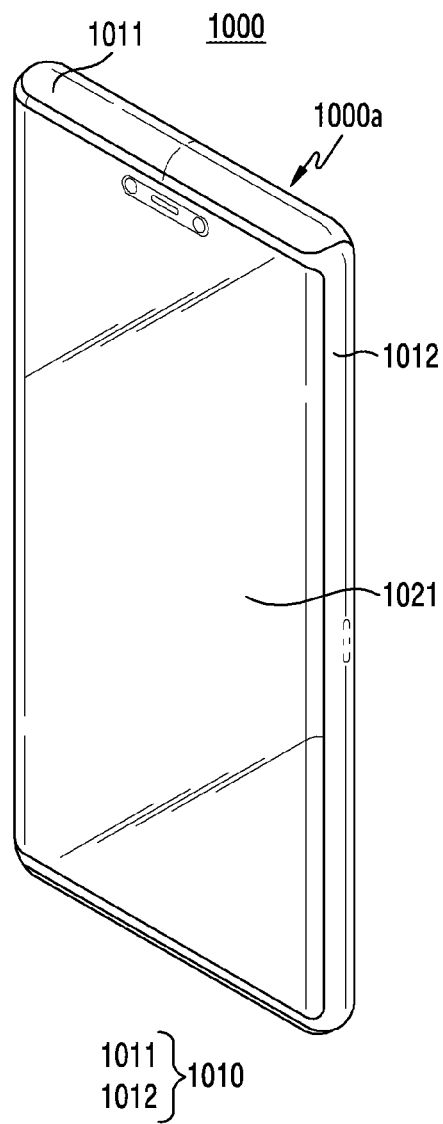
FIG. 10A is a perspective view illustrating an electronic device according to an example embodiment in a first state.
Figure 10B:
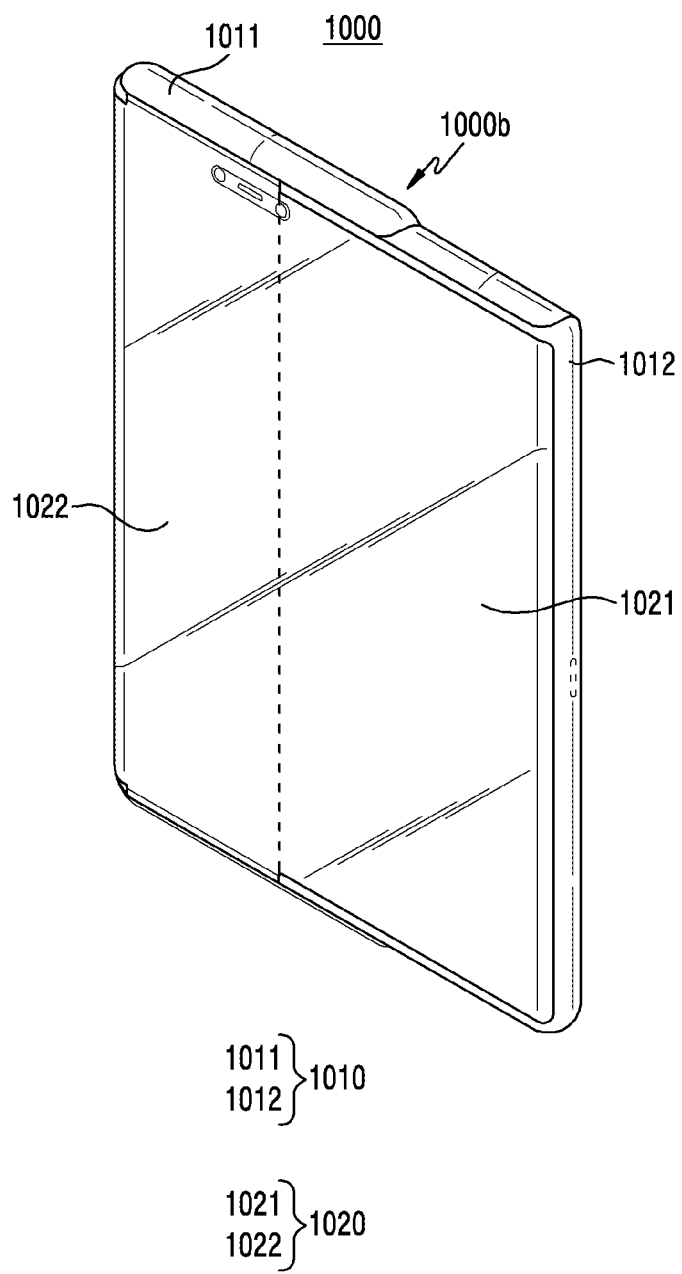
FIG. 10B is a perspective view illustrating the electronic device according to an example embodiment in a second state.

FIG. 10A is a perspective view illustrating an electronic device according to an embodiment in a first state. FIG. 10B is a perspective view illustrating the electronic device according to an embodiment in a second state.

Referring to FIGS. 10A and 10B, a display 1020 may be located on one surface of an electronic device 1000 according to an embodiment. Hereinafter, the surface on which the display 1020 is located will be referred to as a front surface (e.g., the front surface 110A in FIG. 1). According to an embodiment, the display 1020 may occupy most of the front surface of the electronic device 1000. According to an embodiment, the display 1020 may have a flat shape and a curved shape. On the front surface of the electronic device 1000, the display 1020 and a housing 1010 surrounding at least some of the edges of the display 1020 may be disposed. According to an embodiment, the housing 1010 may define a partial area of the front surface, the side surface, and the rear surface of the electronic device 1000. According to another embodiment, the housing 1010 may define a partial area of the side surface and the rear surface of the electronic device 1000. According to an embodiment, the housing 1010 may include a first housing 1011 and a second housing 1012 movable relative to the first housing 1011.

According to an embodiment, the display 1020 may include a first portion 1021 that may be coupled to the second housing 1012 and a second portion 1022 that may extend from the first portion 1021 and may be slid into the inside of the electronic device 1000. According to an embodiment, when the electronic device 1000 is switched from a first state 100*a* to a second state 100*b* according to the movement of the second housing 1012, the second portion 1022 of the display 1020 may be slid out from the inside to the outside of the electronic device 1000. According to an embodiment, when the electronic device 1000 is switched from the second state 1000*b* to the first state 1000*a* according to the movement of the second housing 1012, the second portion 1022 of the display 1020 may be slid into the inside of the electronic device 1000.

Figure 11A:
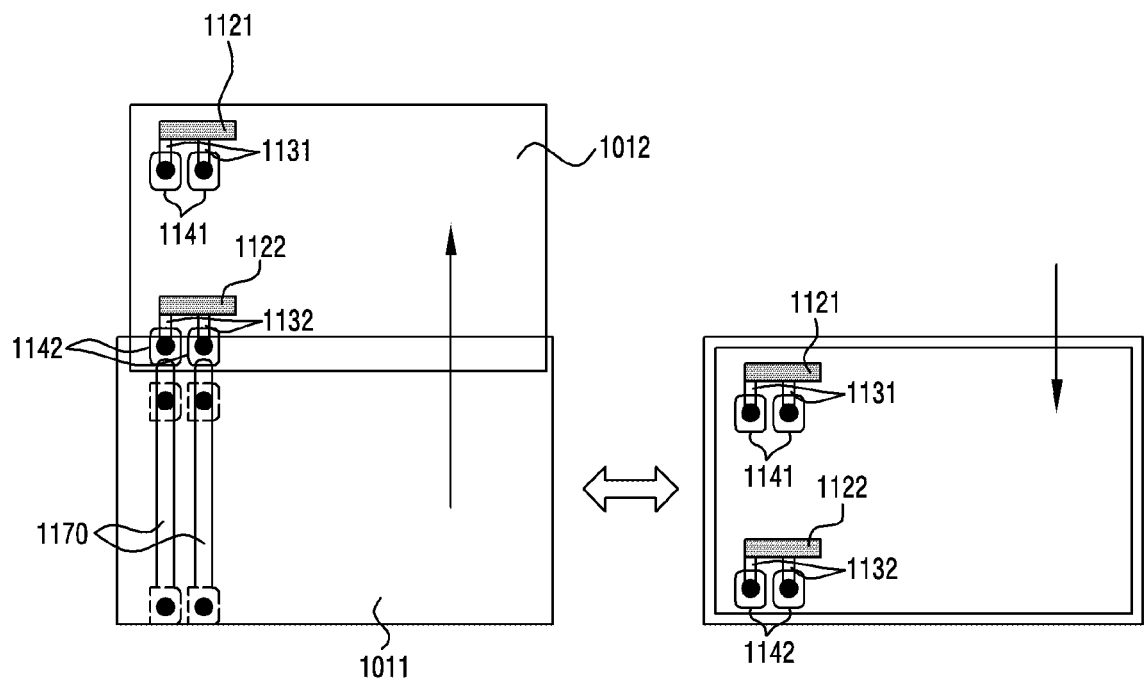
FIG. 11A illustrates an electronic device including a first housing and a second housing movable relative to the first housing, according to an example embodiment.
Figure 11B:
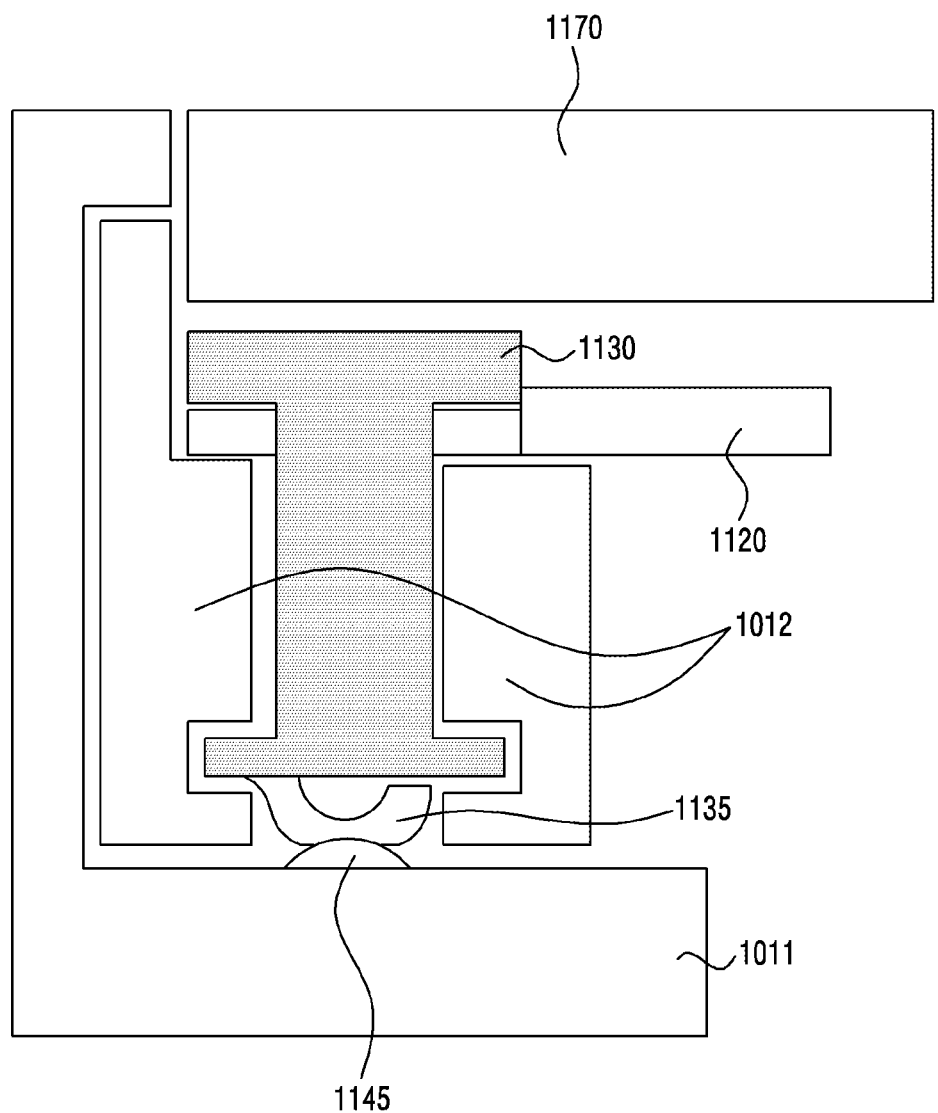
FIG. 11B illustrates a power feeding structure coupled to a first housing in a first direction in the electronic device of FIG. 11A.
Figure 11C:
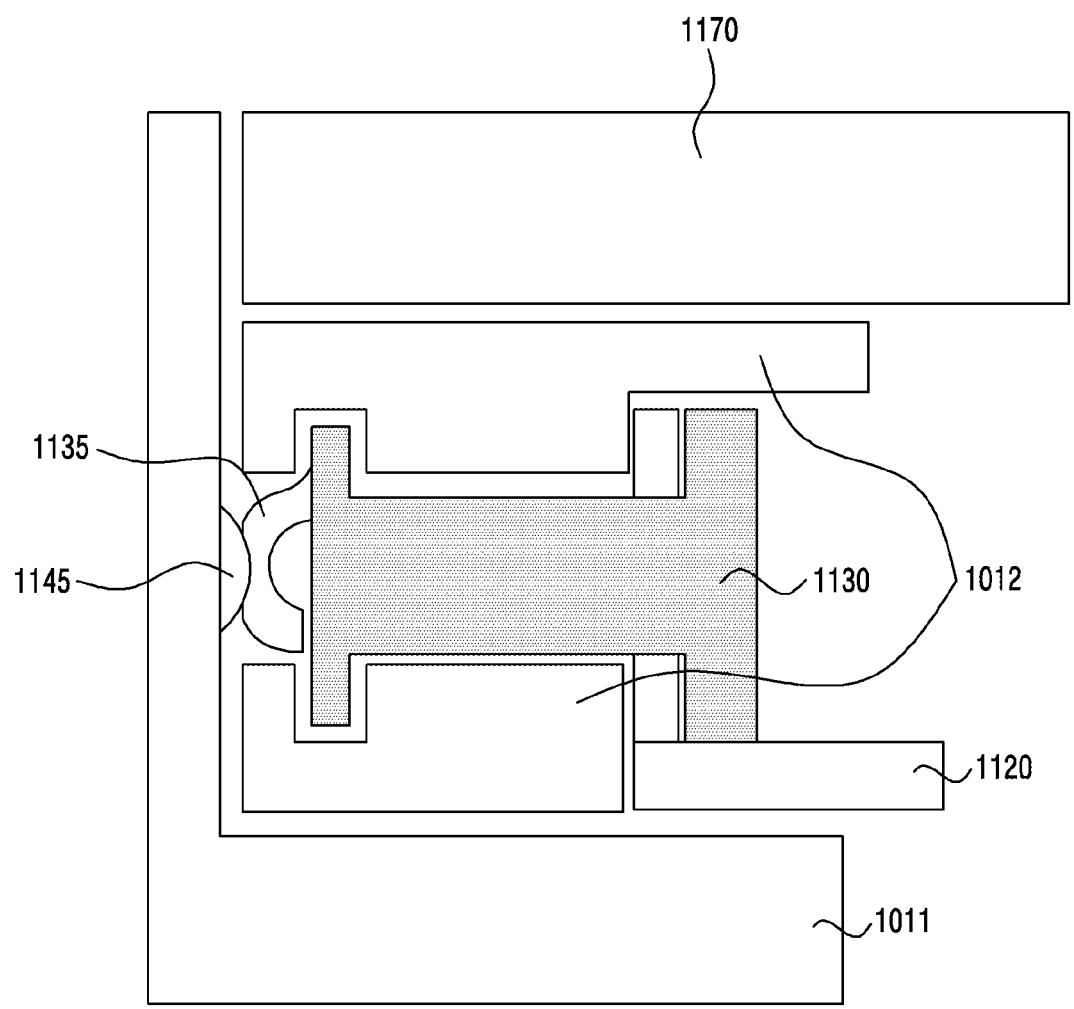
FIG. 11C illustrates a power feeding structure coupled to a first housing in a second direction in the electronic device of FIG. 11A.

FIG. 11A illustrates an electronic device including a first housing and a second housing movable relative to the first housing, according to an embodiment. FIG. 11B illustrates a power feeding structure coupled to the first housing in a first direction in the electronic device of FIG. 11A. FIG. 11C illustrates a power feeding structure coupled to the first housing in a second direction in the electronic device of FIG. 11A.

Referring to FIGS. 10A, 10B, and 11A together, the electronic device 1000 may include at least one FPCB 1120, at least one conductive connecting member 1130 coupled to the FPCB 1120, a display 1170, and/or a groove 1140 formed at one point of the housing 1010. The same reference numerals are used for substantially the same components, and redundant descriptions will be omitted.

According to an embodiment, at least one FPCB 1120 may be connected to the second housing 1012 at a first point via the conductive connecting member 1130. According to an embodiment, as the second housing 1012 moves relative to the first housing 1011 and is switched to the first state 1000*a*, the at least one FPCB 1120 may be electrically connected to the first housing 1011 at a second point via the conductive connecting member 1130. According to an embodiment, as the second housing 1012 moves, a space corresponding to the moving conductive connecting member 1130 may be provided in the first housing 1011.

Referring to FIGS. 11A, 11B, and 11C together, the conductive connecting member 1130 according to an embodiment may have one end coupled to the FPCB 1120 and the other end coupled to an elastic body 1135. According to an embodiment, the first housing 1011 may include a protrusion 1145 that may come into contact with the elastic body 1135. However, some of the above components (e.g., the elastic body 1135 or the protrusion 1145) may be omitted. According to another embodiment, the other end of the conductive connecting member 1130 may come into direct contact with the first housing 1011. According to an embodiment, an electronic device (e.g., the electronic device 1000 of FIG. 10A) may include at least one valley 1170. According to an embodiment, the first housing 1011 may include at least one valley 1170 through which the elastic body 1153 is movable according to the movement of the second housing 1012.

Referring to FIG. 11B, the conductive connecting member 1130 according to an embodiment may be coupled to the housing 1010 in a direction substantially perpendicular to the display 1170 of the electronic device 1000. Referring to FIG. 11C, the conductive connecting member 1130 according to another embodiment may be coupled to the housing 1010 in a direction substantially parallel to the display 1170 of the electronic device 1000, but the angle at which the conductive connecting member 1130 is coupled to the housing 1010 is not limited thereto.

According to an embodiment, the FPCB 1120 may be electrically connected to the second housing 1012 in the second state 1000b, and may be electrically connected to the first housing 1011 and the second housing 1012 in the first state 1000a. According to an embodiment, a wireless communication circuit (e.g., a radio-frequency integrated circuit (RFIC)) may transmit or receive a signal of a predetermined frequency by feeding power to the housing 1010 via the FPCB 1120. For example, the wireless communication circuit may transmit or receive a first signal of a first frequency band by feeding power to the second housing 1012 in the second state 1000b. For example, the wireless communication circuit may transmit or receive a second signal of a second frequency band by feeding power to the first housing 1011 and the second housing 1012 in the first state 1000a.

Figure 12:
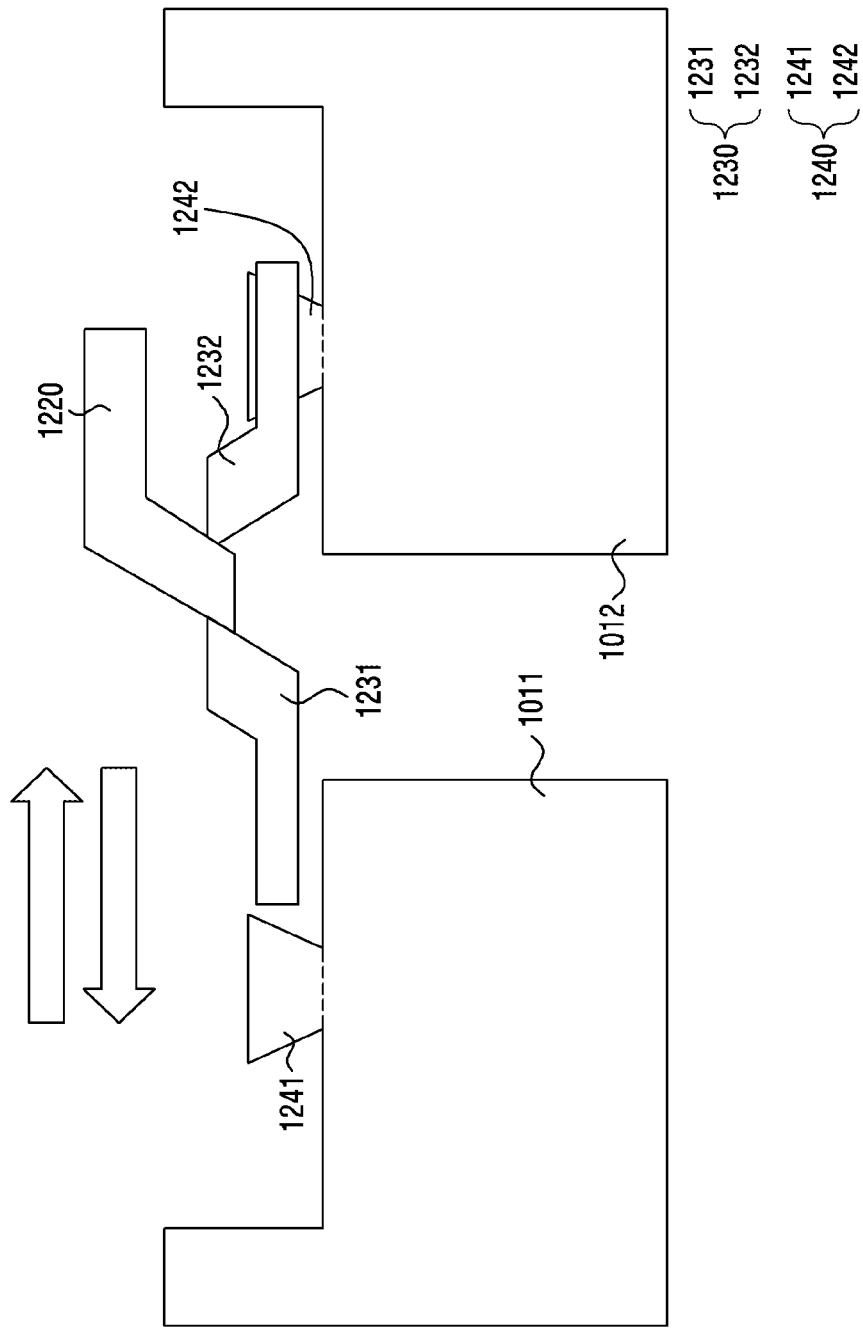
FIG. 12 illustrates a conductive connecting member couplable to the second housing and the first housing according to an example embodiment.

FIG. 12 illustrates a conductive connecting member couplable to the second housing and the first housing according to an embodiment.

Referring to FIGS. 10A, 10B, and 12, an electronic device 1000 according to an embodiment may include an FPCB 1220 disposed inside the electronic device 1000, a conductive connecting member 1230 coupled to one end of the FPCB 1220, a first housing 1011, a second housing 1012 movable relative to the first housing 1011, and a protrusion 1240 provided at one point of the housing 1010. The same reference numerals are used for substantially the same/similar components, and redundant descriptions will be omitted.

Referring to FIGS. 8A, 8B, and 12 together, the conductive connecting member 1230 may be coupled to the protrusion 1240. For example, the conductive connecting member 1230 may have a c-clip shape and may be coupled to enclose the protrusion 1240. However, the shape of the conductive connecting member 1230 is not limited thereto. The conductive connecting member 1230 according to an embodiment may be implemented substantially the same as the conductive connecting member 830 of FIG. 8B.

According to an embodiment, a second conductive connecting member 1232 may be coupled to a second protrusion 1242. According to an embodiment, a first conductive connecting member 1231 may be coupled to a first protrusion 1241. For example, the first conductive connecting member 1231 may be separated from the first protrusion 1241, and the second conductive connecting member 1232 may be coupled to the second protrusion 1242 in the second state 1000b. For example, in the first state 1000a, the first conductive connecting member 1231 may be coupled to the first protrusion 1241 and the second conductive connecting member 1232 may be coupled to the second protrusion 1242.

The electronic device 1000 according to an embodiment may include a wireless communication circuit. According to an embodiment, the wireless communication circuit may transmit or receive a first signal of a first frequency band by feeding power to the second housing 1012 in the second state 1000b. According to an embodiment, the wireless communication circuit may transmit or receive a second signal of a second frequency band by feeding power to the first housing 1011 and the second housing 1012 in the first state 1000a. According to another embodiment, the wireless communication circuit may transmit or receive a third signal of a third frequency band by feeding power to the first housing 1011 in the first state 1000a.

Figure 13:
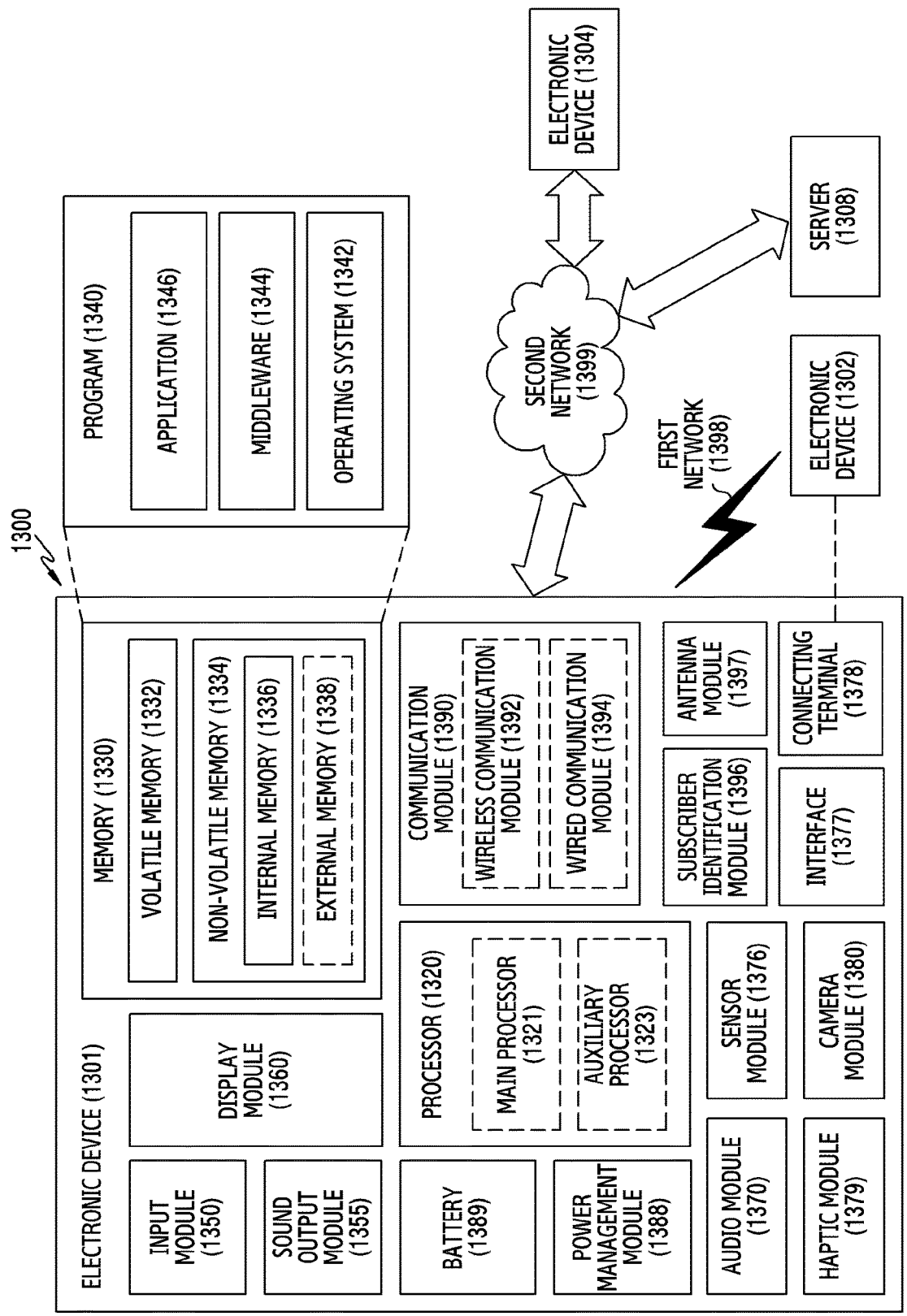
FIG. 13 is a block diagram of an electronic device according to various example embodiments in a network environment.

FIG. 13 is a block diagram of an electronic device in a network environment according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control, for example, at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active (e.g., executing an application) state. According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence model is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or an external electronic device (e.g., an electronic device 1302 (e.g., a speaker or a headphone)) directly or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly or wirelessly. According to an embodiment, the interface 1377 may include, for example, a high definition multimedia interface (HDMI), a universal serial bus (USB) interface, a secure digital (SD) card interface, or an audio interface.

The connecting terminal 1378 may include a connector via which the electronic device 1301 may be physically connected with the external electronic device (e.g., the electronic device 1302). According to an embodiment, the connecting terminal 1378 may include, for example, an HDMI connector, a USB connector, an SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device 1304 via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify or authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, an RFIC disposed on, directly or indirectly, a first surface (e.g., the bottom surface) of the printed circuit board, or adjacent to the first surface and capable of supporting a designated high-frequency band (e.g., the mmWave band), and a plurality of antennas (e.g., array antennas) disposed on, directly or indirectly, a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to example embodiments is not limited to those described above.

It should be appreciated that various example embodiments and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via at least a third element(s).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC). Thus, each "module" herein may comprise circuitry.

Various embodiments as set forth herein may be implemented as software (e.g., the program 1340) including one or more instructions that are stored in a storage medium (e.g., the internal memory 1336 or external memory 1338) that is readable by a machine. For example, a processor (e.g., the processor 1320) of the machine may invoke at least one of the one or more stored instructions from the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

An electronic device according to an embodiment may include a housing including a first surface facing a first direction, a second surface facing a second direction opposite to the first direction, and a third surface surrounding a space defined by the first surface and the second surface, a metal frame defining at least one area of the housing, wherein the metal frame includes a groove provided at a first point, a flexible printed circuit board (FPCB) disposed in an inner space of the housing, a conductive connecting member coupled to the FPCB, wherein the conductive connecting member may include a first portion fixed, directly or indirectly, to an area of the FPCB, and a second portion having elasticity, and a wireless communication circuit disposed on, directly or indirectly, the FPCB or electrically connected to the FPCB. At least a portion of the second portion of the conductive connecting member may be inserted into the groove of the metal frame, and the wireless communication circuit may be configured to transmit/receive a signal of a predetermined frequency band by feeding power to the metal frame at the first point via the FPCB and the conductive connecting member.

According to an embodiment, the groove may be provided in a direction parallel to the third surface of the electronic device (e.g., the housing). According to an embodiment, the groove may be provided in a direction parallel to the third surface of the electronic device (e.g., the housing).

According to an embodiment, the groove may include at least one fastening portion, the second portion of the conductive connecting member may include a protrusion having a shape corresponding to the fastening portion, and the second portion of the conductive connecting member may be inserted into the groove and rotated by a predetermined angle so that the fastening portion and the protrusion correspond to each other.

According to an embodiment, the groove may have a shape corresponding to a shape of the second portion of the conductive connecting member.

According to an embodiment, the housing may include a protrusion configured to come into contact with the second portion.

According to an embodiment, the groove may include at least one protrusion facing inside of the metal inclusive frame.

According to an embodiment, an electronic device may include a housing including a first housing and a second housing coupled to the first housing to be movable with respect to the first housing, wherein the housing may include a connecting portion provided at the first point, at least one flexible printed circuit board (FPCB) disposed in an inner space of the housing, a conductive connecting member coupled to the FPCB, wherein the conductive connecting member may include a first portion fixed, directly or indirectly, to an area of the FPCB, and a second portion having elasticity, and a wireless communication circuit disposed on the FPCB or electrically connected to the FPCB. The conductive connecting member may be coupled to the second housing by bringing the second portion into contact with the connecting portion, when the first housing and the second housing are coupled in a first state, the FPCB may be disposed at a first position, and when the second housing is moved relative to the first housing in the first state and the first housing and the second housing are coupled in a second state, the FPCB may be disposed at a second position, and the second portion of the conductive connecting member may come into contact with the first housing. The wireless communication circuit may be configured to transmit/receive a first signal of a first frequency band by feeding power to the second housing in the first state, and to transmit/receive a second signal of a frequency band by feeding power to the first housing and the second housing in the second state.

According to an embodiment, an elastic body coupled to the second portion of the conductive connecting member may be included, and the conductive connecting member may come into contact with the first housing via the elastic body in the second state.

According to an embodiment, the first housing may include a protrusion configured to come into contact with the elastic body.

According to an embodiment, the connecting portion may include a protrusion provided at the first point of the housing, and the second portion of the conductive connecting member may have a hook shape to be engaged with the protrusion.

According to an embodiment, the connecting portion includes a first protrusion provided at the first point of the housing and a second protrusion provided at a second point of the housing, and the conductive connecting member may be coupled to the first protrusion in the first state and coupled to the first protrusion and the second protrusion in the second state, by using the second portion having the hook shape.

According to an embodiment, the connecting portion may include a groove provided at the first point of the housing, and the conductive connecting member may be coupled to the housing by inserting the second portion into the groove.

According to an embodiment, the connecting portion may include a first groove provided at the first point of the housing and a second groove provided at a second point of the housing, the conductive connecting member may further include a third portion having a shape corresponding to the second portion, the conductive connecting may be configured such that in the first state, the second portion is inserted into the first groove, and in the second state, the second portion is inserted into the first groove, and the third portion is inserted into the second groove.

According to an embodiment, the groove may have a shape corresponding to the shape of the second portion of the conductive connecting member.

An electronic device according to an embodiment may include a flexible printed circuit board (FPCB) disposed inside the housing, a wireless communication circuit disposed on the FPCB or electrically connected to the FPCB, a conductive connecting member connected to one end of the FPCB, and a metal member including a connecting portion configured to be coupled to the conductive connecting member. The wireless communication circuit may transmit/receive a signal by feeding power to the metal member via the conductive connecting member.

According to an embodiment, the connecting portion may include a protrusion provided at a first point of the metal member, and the conductive connecting member may be coupled to the protrusion while enclosing the protrusion.

According to an embodiment, the connecting portion may include a groove provided at the first point of the metal member, and the conductive connecting member may be coupled to the groove by being inserted into the groove.

According to an embodiment, the groove may have a shape corresponding to the shape of the conductive connecting member.

According to an embodiment, the groove may include at least one protrusion configured to come into contact with the conductive connecting member.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising: a housing comprising a first surface facing a first direction, a second surface facing a second direction opposite to the first direction, and a third surface at least partially surrounding a space at least partially defined by the first surface and the second surface; a metal inclusive frame defining at least one area of the housing, the metal inclusive frame comprising a groove provided at a first point; a flexible printed circuit board (FPCB) at least partially disposed in an inner space of the housing; a conductive connecting member, comprising conductive material, coupled to the FPCB, wherein the conductive connecting member comprises a first portion fixed to an area of the FPCB, and a second portion having elasticity; and a wireless communication circuit disposed on the FPCB and/or electrically connected to the FPCB, wherein at least a portion of the second portion of the conductive connecting member is inserted into the groove of the metal inclusive frame, and the wireless communication circuit is configured to transmit and/or receive a signal of a predetermined frequency band at least by feeding power to the metal inclusive frame at the first point via the FPCB and the conductive connecting member, wherein the housing comprises a first housing, a second housing coupled to the first housing to be movable with respect to the first housing, and a connecting portion provided at least partially at the first point, the conductive connecting member is coupled to the second housing at least by bringing the second portion into contact with the connecting portion, the FPCB is configured to be disposed at a first position in a case that the first housing and the second housing are coupled in a first state, and the FPCB is configured to be disposed at a second position and the second portion of the conductive connecting member is brought into contact with the first housing, in a case that the second housing is moved relative to the first housing in the first state and the first housing and the second housing are coupled in a second state.

2. The electronic device of claim 1, wherein the groove is provided in a direction parallel to the third surface of the housing.

3. The electronic device of claim 1, wherein the groove is provided in a direction perpendicular to the third surface of the housing.

4. The electronic device of claim 1, wherein the groove comprises at least one fastening portion,
the second portion of the conductive connecting member comprises a protrusion comprising a shape corresponding to the fastening portion,
the second portion of the conductive connecting member is inserted into the groove and rotated by a predetermined angle so that the fastening portion and the protrusion correspond to each other.

5. The electronic device of claim 1, wherein the groove has a shape corresponding to a shape of the second portion of the conductive connecting member.

6. The electronic device of claim 1, wherein the housing further comprises a protrusion configured to come into contact with the second portion.

7. The electronic device of claim 1, wherein the groove comprises at least one protrusion facing inside of the metal inclusive frame.

8. The electronic device of claim 1, wherein the wireless communication circuit is configured to:
transmit and/or receive a first signal in a first frequency band at least by feeding power to the second housing in the first state; and
transmit and/or receive a second signal of a second frequency band at least by feeding power to the first housing and the second housing in the second state.

9. The electronic device of claim 8, further comprising an elastic body coupled to the second portion of the conductive connecting member,
wherein the conductive connecting member is configured to come into contact with the first housing via the elastic body in the second state.

10. The electronic device of claim 9, wherein the first housing comprises a protrusion configured to come into contact with the elastic body.

11. The electronic device of claim 8, wherein the connecting portion comprises a protrusion provided at the first point of the housing, and
the second portion of the conductive connecting member comprises a hook shape configured to be engaged with the protrusion.

12. The electronic device of claim 11, wherein the connecting portion comprises a first protrusion provided at the first point of the housing and a second protrusion provided at a second point of the housing, and
the conductive connecting member is configured to be coupled to the first protrusion in the first state and to be coupled to the first protrusion and the second protrusion in the second state, at least by using the second portion having the hook shape.

13. The electronic device of claim 8, wherein the connecting portion comprises a groove provided at the first point of the housing, and
the conductive connecting member is configured to be coupled to the housing by inserting the second portion into the groove.

14. The electronic device of claim 8, wherein the connecting portion comprises a first groove provided at the first point of the housing and a second groove provided at a second point of the housing,
the conductive connecting member further comprises a third portion having a shape corresponding to the second portion, and
the conductive connecting member is configured such that:
in the first state, the second portion is inserted into the first groove; and
in the second state, the second portion is inserted into the first groove, and
the third portion is inserted into the second groove.

* * * * *